(12) United States Patent
Schoenfeld et al.

(10) Patent No.: US 12,106,179 B2
(45) Date of Patent: Oct. 1, 2024

(54) MEASUREMENT AGGREGATION IN QUANTUM PROGRAMS

(71) Applicant: International Business Machines Corporation, Armonk, NY (US)

(72) Inventors: Zachary Schoenfeld, New York, NY (US); Helena Zhang, White Plains, NY (US); Soolu Thomas, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 958 days.

(21) Appl. No.: 17/125,312

(22) Filed: Dec. 17, 2020

(65) Prior Publication Data

US 2022/0198309 A1 Jun. 23, 2022

(51) Int. Cl.
*G06N 10/00* (2022.01)
*G06F 16/242* (2019.01)

(52) U.S. Cl.
CPC ........... *G06N 10/00* (2019.01); *G06F 16/244* (2019.01)

(58) Field of Classification Search
CPC ...................................................... G06N 10/00
USPC .......................................................... 706/62
See application file for complete search history.

(56) References Cited

U.S. PATENT DOCUMENTS

| | | | | |
|---|---|---|---|---|
| 4,079,301 A * | 3/1978 | Johnson, III | ......... | H02P 7/2985 |
| | | | | 388/805 |
| 6,526,573 B1 * | 2/2003 | Babaian | ............... | G06F 8/4451 |
| | | | | 717/161 |
| 9,146,746 B2 * | 9/2015 | Ceze | ..................... | G06F 9/3851 |
| 10,068,052 B2 * | 9/2018 | van Rooyen | ......... | G16B 50/00 |
| 10,068,183 B1 | 9/2018 | Rooyen | | |
| 10,223,084 B1 * | 3/2019 | Dunn | ..................... | G06N 10/00 |

(Continued)

OTHER PUBLICATIONS

Y. Shi et al., "Optimized compilation of aggregated instructions for realistic quantum computers", Proc. 24th Int. Conf. Architectural Support Programming Lang. Oper. Syst., pp. 1031-1044, 2019. (Year: 2019).*

(Continued)

*Primary Examiner* — Reza Nabi
(74) *Attorney, Agent, or Firm* — Amin, Turocy & Watson, LLP

(57) ABSTRACT

Systems and techniques that facilitate measurement aggregation in quantum programs are provided. In various embodiments, a system can comprise an input component that can access a quantum program. In various instances, the system can further comprise an aggregation component that can aggregate quantum measurement instructions that are listed in the quantum program. In various embodiments, the aggregation component can aggregate the quantum measurement instructions by: identifying a first quantum measurement instruction in the quantum program; identifying another quantum instruction in the quantum program that is adjacent to the first quantum measurement instruction; and swapping and/or merging the first quantum measurement instruction with the another quantum instruction based on determining whether the first quantum measurement instruction and the another quantum instruction share qubits and based on determining whether the another quantum instruction is a quantum measurement instruction.

20 Claims, 21 Drawing Sheets

(56) References Cited

U.S. PATENT DOCUMENTS

| | | | | |
|---|---|---|---|---|
| 10,614,371 | B2* | 4/2020 | Bishop | G06F 12/1416 |
| 10,684,781 | B1* | 6/2020 | Martin | G06F 3/067 |
| 11,373,113 | B1* | 6/2022 | Cruise | G06N 10/80 |
| 11,379,196 | B2* | 7/2022 | Gazda | G06N 10/00 |
| 11,386,347 | B2* | 7/2022 | Low | G06N 10/00 |
| 11,902,205 | B2* | 2/2024 | Molés Cases | H04L 5/0094 |
| 2019/0180197 | A1* | 6/2019 | Granade | G06N 10/00 |
| 2020/0219003 | A1* | 7/2020 | Gazda | G06F 30/398 |
| 2021/0334081 | A1* | 10/2021 | Chong | G06F 8/443 |
| 2021/0342728 | A1* | 11/2021 | Woerner | G06N 10/60 |
| 2021/0374594 | A1* | 12/2021 | Langer | G06N 10/80 |
| 2022/0147856 | A1* | 5/2022 | Kliuchnikov | G06F 30/327 |
| 2022/0164505 | A1* | 5/2022 | Mosca | G06N 10/20 |
| 2022/0193973 | A1* | 6/2022 | Althermeler | B29C 48/0022 |
| 2022/0198309 | A1* | 6/2022 | Schoenfeld | G06F 16/244 |
| 2022/0414492 | A1* | 12/2022 | Jezewski | G06N 5/04 |
| 2023/0216671 | A1* | 7/2023 | Chen | H04L 9/0855 380/256 |

OTHER PUBLICATIONS

Griffiths, "Measurement-Based Quantum Computation," Apr. 2014, 10 pages.
Raussendorf et al., "Quantum computation by local measurement," arXiv:1208.0041v1 [quant-ph], 2012, 36 pages.
Briegel et al., "Measurement-based quantum computation," arXiv:0910.1116v2 [quant-ph], 2009, 20 pages.
Disclosed Anonymously, "Generalized Restless Measurements," IP.com No. IPCOM000263314D, Aug. 17, 2020, 8 pages.
Disclosed Anonymously, "Quantum Developer Visualization Tool (QDVT)," IP.com No. IPCOM000261581D, Mar. 18, 2020, 8 pages.
Disclosed Anonymously, "System and method to assess quantum use case potential," IP.com No. IPCOM000261173D, Feb. 5, 2020, 5 pages.
Nielsen et al., "Quantum Computation and Quantum Information," 10th Anniversary Edition, 2010, 710 pages.
Haner et al., "A software methodology for compiling quantum programs," Quantum Science and Technology, 2018, 19 pages.
Smith et al., "An Open-Source, Industrial-Strength Optimizing Compiler for Quantum Programs," https://arxiv.org/pdf/2003.13961, 2020, 29 pages.
Nguyen et al., "Extending XACC for Quantum Optimal Control," https://arxiv.org/abs/2006.02837, 2020, 11 pages.
Shi et al, "Optimized Compilation of Aggregated Instructions for Realistic Quantum Computers," https://arxiv.org/pdf/1902.01474, 2019, 14 pages.
"Qiskit," https://qiskit.org/, last accessed Dec. 8, 2020, 5 pages.
Mell, Peter, et al. "The NIST Definition of Cloud Computing." National Institute of Standards and Technology. Sep. 2011. 7 pages.

\* cited by examiner

MEASUREMENT AGGREGATION IN QUANTUM PROGRAMS

BACKGROUND

The subject disclosure relates to quantum computing, and more specifically to measurement aggregation in quantum programs.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate measurement aggregation in quantum programs are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise an input component that can access a quantum program. In various instances, the computer-executable components can further comprise an aggregation component that can aggregate quantum measurement instructions that are listed in the quantum program. In various embodiments, the aggregation component can aggregate the quantum measurement instructions by: identifying a first quantum measurement instruction in the quantum program; identifying another quantum instruction in the quantum program that is adjacent to the first quantum measurement instruction; and determining whether the first quantum measurement instruction and the another quantum instruction share qubits. In various embodiments, the aggregation component can further aggregate the quantum measurement instructions by: in response to determining that the first quantum measurement instruction and the another quantum instruction do not share qubits, determining whether the another quantum instruction is a quantum measurement instruction. In various embodiments, the aggregation component can further aggregate the quantum measurement instructions by: in response to determining that the another quantum instruction is a quantum measurement instruction, merging the first quantum measurement instruction and the another quantum instruction into a single quantum measurement instruction. In various embodiments, the aggregation component can further aggregate the quantum measurement instructions by: in response to determining that the another quantum instruction is not a quantum measurement instruction, swapping the first quantum measurement instruction and the another quantum instruction in the quantum program.

According to one or more embodiments, the above-described system can be implemented as a computer-implemented method and/or computer program product.

DETAILED DESCRIPTION

Figure 1:
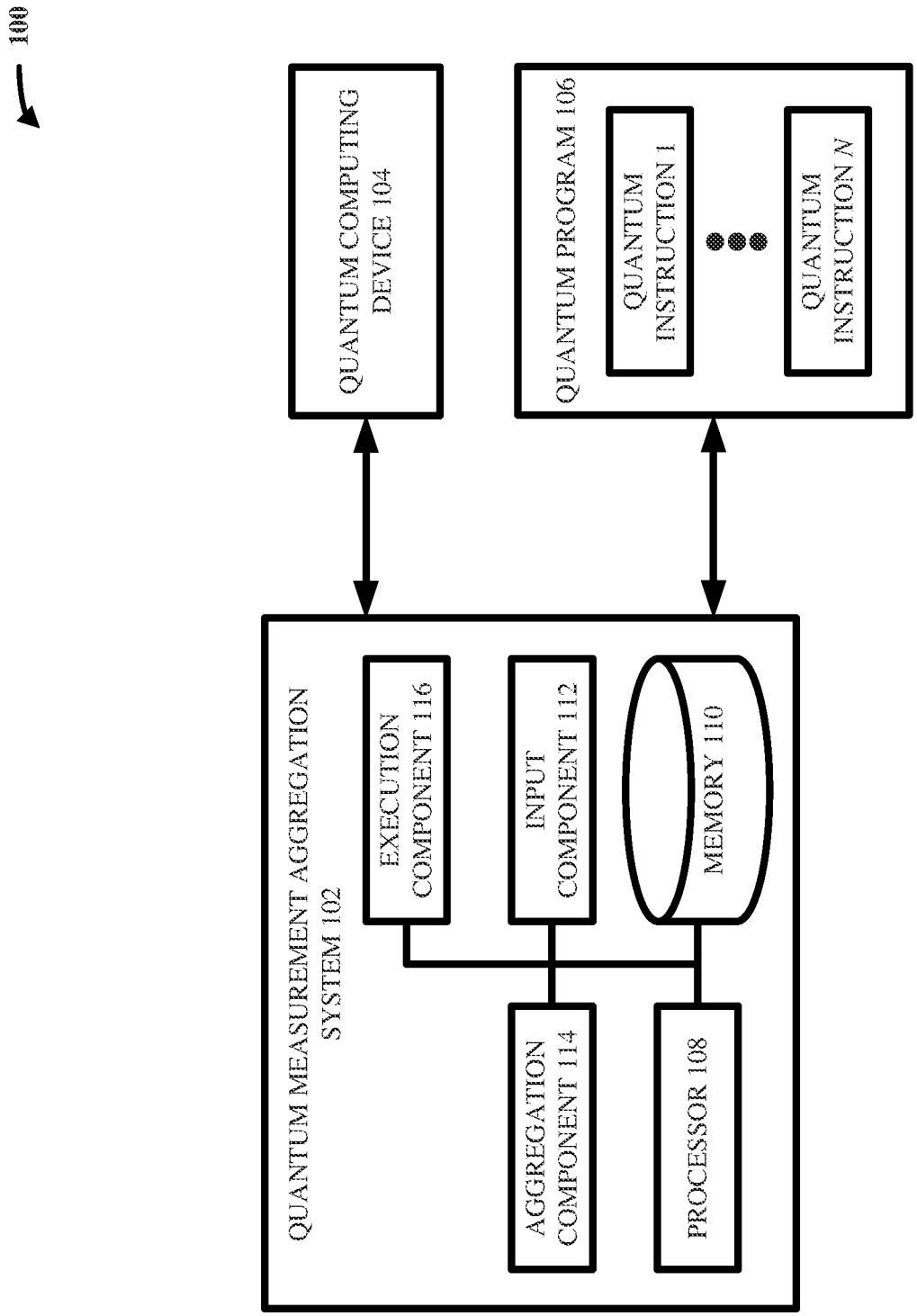
FIG. 1 illustrates a block diagram of an example, non-limiting system that facilitates measurement aggregation in quantum programs in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A quantum computing device can include any suitable quantum substrate (e.g., silicon wafer) on which a set of any suitable qubits (e.g., one or more superconducting qubits, one or more spin-based qubits, and/or any other suitable implementation of quantum bit information) can be fabricated via any suitable nanofabrication and/or microfabrication techniques (e.g., deposition, etching, patterning, angled evaporation, photolithography). The quantum computing device can facilitate quantum computations by executing quantum programs. A quantum program can be an ordered list of quantum instructions that can be performed on the set of qubits, where a quantum instruction can be any suitable atomic operation that can be performed on a qubit and/or on a plurality of parallel qubits in a given time slot. In some cases, a quantum program can include conditional execution of quantum instructions based on previous execution results. In some cases, a quantum instruction can be a quantum gate (e.g., Hadamard gate, Phase gate, Pauli-X gate, Pauli-Y gate, Pauli-Z gate, CNOT gate, Toffoli gate) and/or a plurality of quantum gates that are combined in parallel via Kronecker products. In some cases, a quantum instruction can be a quantum measurement (e.g., which can probe, read, and/or otherwise return the current state of a qubit) and/or a plurality of parallel quantum measurements. A quantum instruction that calls for a quantum measurement can be referred to as a quantum measurement instruction.

Quantum measurement instructions can be resource-intensive due to hardware acquisition time and/or classical data processing. That is, any given quantum measurement instruction can involve the expenditure of computational resources (e.g., time, processing power, memory) on acquiring the states of desired qubits and/or on transmitting such data downstream for classical storage and/or processing. Indeed, quantum measurement instructions can be particularly cumbersome when multiplexed readout hardware is implemented, where each measurement acquires the states of all qubits that are multiplexed together, where the states cannot be filtered by qubit until all the states have been acquired, and where execution of the quantum program is thus blocked until all the data for a particular measurement has been acquired. In any case (e.g., even when multiplexed readout hardware is not employed), each quantum measurement instruction in a quantum program can be associated with a certain amount of computational overhead cost. Thus, a quantum program that includes multiple quantum measurement instructions can sometimes experience compounding of such computational overhead costs, which can result in extended runtime and/or excessive consumption of computational resources. Systems and/or techniques that can address one or more of these technical problems can be desirable.

Various embodiments of the invention can address one or more of these technical problems by facilitating measurement aggregation in quantum programs. Specifically, the inventors of various embodiments of the invention devised systems and/or techniques to reorder and/or aggregate quantum measurement instructions that are listed in a quantum program so as to minimize the number of quantum measurement instructions in the quantum program without changing the net result of the quantum program. In various aspects, a quantum measurement instruction can be moved to different locations within a quantum program (e.g., can be moved to an earlier time slot and/or to a later time slot) without changing the net result of the quantum program. In various instances, any two quantum instructions that are listed as adjacent in a quantum program can be commuted with each other (e.g., can switch time slots) without changing the net result of the quantum program if such quantum instructions operate on completely different qubits. Accordingly, quantum measurement instructions listed in a quantum program can be reordered and/or combined so as to minimize and/or reduce the number of quantum measurement instructions in the quantum program without substantively changing the quantum program. When the number of quantum measurement instructions is minimized and/or reduced as described herein, the computational overhead costs associated with such quantum measurement instructions can be commensurately minimized and/or reduced, without changing the overall computation facilitated by the quantum program. In other words, various embodiments of the invention can reduce runtimes and/or expenditures of computational resources associated with quantum programs.

Various embodiments of the invention can provide systems and/or techniques that can facilitate measurement aggregation in quantum programs. In various aspects, embodiments of the invention can be considered as a computerized tool (e.g., computer-implemented software) that can electronically receive and/or otherwise electronically access a quantum program that is desired to be executed on a quantum computing device. In various instances, the computerized tool can electronically aggregate, as described herein, quantum measurement instructions that are listed in the quantum program, so as to reduce the number of quantum measurement instructions without affecting the net result of the quantum program. In various cases, the computerized tool can perform swap operations on the quantum program and/or can perform merge operations on the quantum program. In various aspects, a swap operation can involve swapping the positions (e.g., the time slots) of two quantum instructions that are listed as adjacent in the quantum program. In various instances, a merge operation can involve merging two quantum measurement instructions that are listed as adjacent in the quantum program, such that the two quantum measurement instructions are in the same time slot (e.g., such that the two quantum measurement instructions can be performed in parallel rather than in series). In various cases, the computerized tool can iteratively perform swap operations and/or merge operations on the quantum program, subject to an aggregation constraint. In various aspects, the aggregation constraint can specify that a swap operation and/or a merge operation can be performed only on adjacent quantum instructions that do not share qubits (e.g., two adjacent quantum instructions can be swapped and/or merged only if they do not operate on any common qubit). Thus, such a computerized tool can electronically receive as input a quantum program, and can electronically and iteratively perform swap operations and/or merge operations on the quantum program subject to the aggregation constraint, thereby yielding as output an optimized quantum program that includes fewer quantum measurement instructions but that is nonetheless substantively equivalent to the inputted quantum program.

At a high level, such a computerized tool can be considered as swapping quantum measurement instructions with quantum non-measurement instructions until quantum measurement instructions are adjacent, and merging quantum measurement instructions with each other once they are adjacent, subject to the aggregation constraint. More specifically, the computerized tool can implement the following six steps (e.g., Step 1, Step 2, Step 3, Step 4, Step 5, and Step 6) to facilitate measurement aggregation in quantum programs.

Step 1 can include finding a next (e.g., in chronological order) quantum measurement instruction in an inputted quantum program. If a next quantum measurement instruction is not found, the computerized tool can proceed to Step 6, discussed below. If the next quantum measurement instruction is found, the computerized tool can label it as "$m_{low}$." The computerized tool can then proceed to Step 2.

Step 2 can include labeling the quantum instruction that follows $m_{low}$ as "$q_{next}$." If $m_{low}$ is the last quantum instruction in the quantum program, the computerized tool can proceed to Step 6. If $q_{next}$ is an a quantum measurement instruction, the computerized tool can determine whether the qubits on which $q_{next}$ operates have a non-zero intersection with the qubits on which $m_{low}$ operates. If they do have a non-zero intersection (e.g., if they share at least one qubit), the quantum measurement instruction that was previously labelled "$q_{next}$" can be re-labelled as "$m_{low}$" and Step 2 can be repeated. If they instead have a null intersection (e.g., if they share no qubits), the computerized tool can merge $m_{low}$ and $q_{next}$ into a single quantum measurement instruction, the computerized tool can label the single quantum measurement instruction as "$m_{low}$," and Step 2 can be repeated. If $q_{next}$ is not a quantum measurement instruction, the computerized tool can determine whether the qubits on which $q_{next}$ operates have a non-zero intersection with the qubits on which $m_{low}$ operates. If they do have a non-zero intersection, the computerized tool can proceed to Step 3, discussed below. If they instead have a null intersection, the computerized tool can exchange the order of (e.g., swap) $m_{low}$ and $q_{next}$, and Step 2 can be repeated.

Step 3 can include finding the next quantum measurement instruction after $m_{low}$. If it is not found, the computerized tool can proceed to Step 6. If it is found, it can be labelled as "$m_{high}$," and the computerized tool can determine whether the qubits on which $m_{high}$ operates have a non-zero intersection with the qubits on which $m_{low}$ operates. If they do have a non-zero intersection, the quantum measurement instruction that was previously labeled "$m_{high}$" can be re-labelled as "$m_{low}$," and Step 2 can be repeated. If they instead have a null intersection, the computerized tool can proceed to Step 4, discussed below.

Step 4 can include labelling the quantum instruction that follows $m_{high}$ as "$q_{next}$." If $m_{high}$ is the last quantum instruction in the quantum program, the computerized tool can proceed to Step 5, discussed below. If $q_{next}$ next is a quantum measurement instruction, the computerized tool can determine whether the qubits on which $q_{next}$ operates have a non-zero intersection with the qubits on which $m_{high}$ operates. If they do have a non-zero intersection, the computerized tool can proceed to Step 5. If they instead have a null intersection, the computerized tool can merge $m_{high}$ and $q_{next}$ next into a single quantum measurement instruction, the computerized tool can label the single quantum measurement instruction as "$m_{high}$," and Step 4 can be repeated. If $q_{next}$ is not a quantum measurement instruction, the computerized tool can proceed to Step 5.

Step 5 can include labelling the quantum instruction that precedes $m_{high}$ as "$q_{prev}$." If $q_{prev}$ is a quantum measurement instruction, the computerized tool can merge $m_{high}$ and $q_{prev}$ into a single quantum measurement instruction, the computerized tool can label the single quantum measurement instruction as "$m_{low}$," and Step 3 can be repeated. If $q_{prev}$ is not a quantum measurement instruction, the computerized tool can determine whether the qubits on which $q_{prev}$ a operates have a non-zero intersection with the qubits on which $m_{high}$ operates. If they do have a non-zero intersection, the quantum measurement instruction that was previously labeled "$m_{high}$" can be re-labelled as "$m_{low}$," and Step 2 can be repeated. If they instead have a null intersection, the computerized tool can exchange the order of $q_{prev}$ and $m_{high}$, and Step 5 can be repeated.

Step 6 can include returning as output the quantum program. In various cases, the outputted version of the quantum program can have fewer quantum measurement instructions than the inputted version of the quantum program, which means that the outputted version of the quantum program can execute more quickly and/or with fewer computational resources than the inputted version of the quantum program. Moreover, Steps 1-6 discussed above can avoid substantively altering the quantum program (e.g., the outputted version of the quantum program can perform the same qubit transformations and/or acquire the same qubit states as the inputted version of the quantum program). Thus, the outputted version of the quantum program can still be substantively equivalent to the inputted version of the quantum program, but can execute/run more quickly/efficiently.

Those having ordinary skill in the art will appreciate that the above six steps are non-limiting examples. In various aspects, such steps can be performed in various different orders. In various instances, more and/or fewer steps can be included.

To help clarify some of the above discussion, consider the following non-limiting example. Suppose a quantum program operates on a system of four qubits and has the following quantum instructions: measure(0), X(1), measure (1), S(2), measure(2), H(3). Such a quantum program can be considered as first measuring the state of qubit 0, then applying a Pauli-X gate to qubit 1, then measuring the state of qubit 1, then applying a Phase gate to qubit 2, then measuring the state of qubit 2, and lastly applying a Hadamard gate to qubit 3. By applying the above Steps 1-6 (e.g., by applying swap operations and/or merge operations according to the aggregation constraint), the quantum program can be optimized as follows.

First, since measure(0) and X(1) are adjacent and do not share qubits (e.g., the set containing qubit 0 has no intersection with the set containing qubit 1), measure(0) can be swapped with X(1). In other words, measure(0) can be placed in the time slot that was previously held by X(1), and X(1) can be placed in the time slot that was previously held by measure(0). Thus, the quantum program can now read as follows: X(1), measure(0), measure(1), S(2), measure(2), H(3).

Now, measure(0) and measure(1) are adjacent measurement instructions in the quantum program and do not share qubits, and so they can be merged together; that is, measure (0) and measure(1) can be placed in the same time slot. In various aspects, any suitable indication that measure(0) and measure(1) are to be executed in parallel can be implemented. Thus, the quantum program can now read as follows: X(1), measure(0,1), S(2), measure(2), H(3).

Next, since measure(0,1) and S(2) are adjacent and do not share qubits (e.g., the set containing qubit 0 and qubit 1 has no intersection with the set containing qubit 2), measure(0,1) can be swapped with S(2). Thus, the quantum program can now read as follows: X(1), S(2), measure(0,1), measure(2), H(3).

Now, measure(0,1) and measure(2) are adjacent measurement instructions in the quantum program and do not share qubits, and so they can be merged together. Thus, the quantum program can now read as follows: X(1), S(2), measure(0,1,2), H(3). As shown, the quantum program can now have one quantum measurement instruction (e.g., measure(0,1,2), which is a multi-qubit measurement instruction) rather than having three separate quantum measurement instructions (e.g., measure(0), measure(1), and measure(2), which are three single-qubit measurement instructions). Thus, the quantum program can execute more quickly and/or with fewer computing resources in its current form that it could in its original form.

The above non-limiting example illustrates how measurement aggregation can be applied to push quantum measurement instructions to later time slots in a quantum program (e.g., measure(0) and measure(1) were both pushed to the later time slot of measure(2)). In various cases, however, measurement aggregation can also be used to push quantum measurement instructions to earlier time slots in a quantum program. For example, consider a quantum program that operates on a system of 4 qubits and has the following quantum instructions: measure(2), measure(0), CNOT(0,2), measure(1), measure(3), CNOT(3,1). Such a quantum program has four separate quantum measurement instructions and can be optimized via measurement aggregation as follows.

First, since measure(2) and measure(0) are adjacent measurement instructions and do not share qubits, they can be merged. The quantum program can now read as follows: measure(0,2), CNOT(0,2), measure(1), measure(3), CNOT(3,1).

Next, measure(0,2) is adjacent to CNOT(0,2) but does share qubits with CNOT(0,2) (e.g., the set containing qubit 0 and qubit 2 has a non-zero intersection with the set containing qubit 0 and qubit 2). Accordingly, measure(0,2) and CNOT(0,2) cannot be swapped. However, measure(1) and measure(3) are adjacent measurement instructions and do not share qubits. Thus, measure(1) can be merged with measure(3). Thus, the quantum program can now read as follows: measure(0,2), CNOT(0,2), measure(1,3), CNOT(3,1).

Now, CNOT(0,2) and measure(1,3) are adjacent and do not share qubits. Accordingly, they can be swapped. The quantum program can now read as follows: measure(0,2), measure(1,3), CNOT(0,2), CNOT(3,1).

Next, measure(0,2) is adjacent to and does not share qubits with measure(1,3) (e.g., the set containing qubit 0 and qubit 2 has a null intersection with the set containing qubit 1 and qubit 3). Thus, measure(0,2) and measure(1,3) can be merged. Thus, the quantum program can read as follows: measure(0,1,2,3), CNOT(0,2), CNOT(3,1).

As shown, the result can be that measure(0), measure(1), and measure(3) were each pushed to the earlier time slot of measure(2). Moreover, as shown, the quantum program went from having four separate quantum measurement instructions to having only one quantum measurement instruction (e.g., four single-qubit measurement instructions to one multi-qubit measurement instruction). As explained above, this reduction in the number of quantum measurement instructions can allow the quantum program to run more quickly and/or with fewer computational resources.

In other words, various embodiments of the invention can be considered as systems and/or techniques that can receive as input a quantum program and that can automatically re-format the quantum program, so as to enable the quantum program to run more quickly and/or to consume fewer computational resources during execution. In various aspects, various embodiments of the invention can execute the re-formatted version of the quantum program on a quantum computing device.

Various embodiments of the invention can be employed to use hardware and/or software to solve problems that are highly technical in nature (e.g., to facilitate measurement aggregation in quantum programs), that are not abstract and that cannot be performed as a set of mental acts by a human. Further, some of the processes performed can be performed by a specialized computer. Specifically, such processes can include: accessing, by a device operatively coupled to a processor, a quantum program; identifying, by the device, a first quantum measurement instruction in the quantum program; identifying, by the device, another quantum instruction that is adjacent to the first quantum measurement instruction; determining, by the device, whether the first quantum measurement instruction and the another quantum instruction share qubits; in response to determining that they do not share qubits, determining, by the device, whether the another quantum instruction is a quantum measurement instruction; in response to determining that it is a quantum measurement instruction, merging by the device, the first quantum measurement instruction and the another quantum instruction; and/or in response to determining that it is not a quantum measurement instruction, swapping, by the device, the first quantum measurement instruction and the another quantum instruction. Such defined tasks are not typically performed manually by humans. Moreover, neither the human mind nor a human with pen and paper can electronically access a quantum program and electronically aggregate quantum measurement instructions in the quantum program. That is, neither the human mind nor a human with pen and paper can electronically swap adjacent quantum instructions that do not share qubits, electronically merge adjacent quantum measurement instructions that do not share qubits, and electronically execute a measurement-aggregated form of the quantum program on a quantum computing device. Instead, various embodiments of the invention are inherently and inextricably tied to computer technology and cannot be implemented outside of a computing environment (e.g., a quantum computing device that executes quantum programs is an inherently computerized object that cannot exist outside of a quantum computing environment; a computerized tool that can optimize the format of a quantum program so as to enable the quantum computing device to more quickly/efficiently execute the quantum program is likewise an inherently computerized object that cannot be practicably implemented in any sensible way without computers).

In various instances, embodiments of the invention can integrate into a practical application the disclosed teachings regarding measurement aggregation in quantum programs. Indeed, as described herein, various embodiments of the invention, which can take the form of systems and/or computer-implemented methods, can be considered as a computerized tool that can electronically receive as input a quantum program and that can electronically perform swap operations and/or merge operations, in accordance with an aggregation constraint described herein, so as to reduce a number of quantum measurement instructions in the quantum program without changing the net result (e.g., the substance) of the quantum program. As mentioned above, any quantum measurement instruction can be associated with a computational overhead cost (e.g., a certain amount of time, processing power, and/or storage space can be consumed for each quantum measurement instruction that is executed). Such computational overhead costs can be compounded and/or exacerbated when multiple quantum measurement instructions are serially implemented. Conversely, such computational overhead costs can be reduced and/or mitigated by reducing the number of quantum measurement instructions in the quantum program (e.g., by parallelizing the quantum measurement instructions). Because various embodiments of the computerized tool described herein can utilize swap operations and/or merge operations subject to an aggregation constraint to reduce the number of quantum measurement instructions of a quantum program, such a computerized tool can enable a quantum program to run more quickly on a quantum computing device and/or to consume fewer computational resources when executed on a quantum computing device, without substantively changing the quantum program. That is, various embodiments of the invention can re-format a quantum program so as to enable the quantum program to run more quickly and/or efficiently. In other words, various embodiments of the invention can improve the very performance of computing systems (e.g., can reduce waste of computational resources associated with quantum programs), and thus such embodiments clearly constitute a concrete and tangible technical improvement in the field of quantum computing.

Furthermore, various embodiments of the invention can control tangible, hardware-based, and/or software-based devices based on the disclosed teachings. For example, embodiments of the invention can electronically receive as input a quantum program and can electronically produce as output an optimized version of the quantum program, where the optimized version of the quantum program contains fewer quantum measurement instructions but is nevertheless equivalent to the inputted quantum program. Moreover, various embodiments of the invention can actually execute the optimized version of the quantum program on a quantum computing device. That is, tangible quantum hardware can be controlled and/or activated by various embodiments of the invention.

It should be appreciated that the figures and the herein disclosure describe non-limiting examples of various embodiments of the invention.

FIG. 1 illustrates a block diagram of an example, non-limiting system 100 that can facilitate measurement aggregation in quantum programs in accordance with one or more embodiments described herein. As shown, a quantum measurement aggregation system 102 can be operatively coupled, via any suitable wired and/or wireless electronic connection, to a quantum computing device 104 and/or to a quantum program 106.

In various aspects, the quantum computing device 104 can comprise any suitable quantum substrate (e.g., silicon) on which can be formed a set of any suitable qubits (e.g., superconducting qubits, spin-based qubits, and/or any other suitable implementation of quantum bit information). In various aspects, any suitable microfabrication and/or nanofabrication techniques can be implemented to manufacture the quantum computing device 104 (e.g., deposition, etching, patterning, angled evaporation, photolithography).

In various instances, the quantum program 106 can comprise an ordered list of quantum instructions (e.g., quantum instruction 1 to quantum instruction n, for any suitable positive integer n). In various cases, the quantum program 106 can be organized and/or formatted in chronological order and/or otherwise according to time slots. So, the quantum instruction 1 can occupy a first time slot and can thus be executed first; a quantum instruction 2 (not shown) can occupy a second time slot and can thus be executed second (e.g., after the quantum instruction 1); and the quantum instruction n can occupy an n-th time slot and can thus be executed last. In various aspects, as mentioned above, a quantum instruction can be a quantum measurement instruction. In other aspects, as mentioned above, a quantum instruction can be not a quantum measurement instruction (e.g., a Hadamard gate, a Phase gate, a Pauli-X gate, a Pauli-Y gate, a Pauli-Z gate, a CNOT gate, a Toffoli gate). In some cases, a quantum instruction can operate on a single qubit (e.g., measure(0) can measure the state of qubit 0; H(1) can apply a Hadamard gate to qubit 1). In other cases, a quantum instruction can operate on multiple qubits at once (e.g., measure(0,2) can measure the states of both qubit 0 and qubit 2, and thus measure(0,2) can be considered as two parallel measure instructions; S(2,3) can apply a Phase gate to both qubit 2 and qubit 3, and thus S(2,3) can be considered as two parallel Phase gates).

In various aspects, the quantum program 106 can be executed on the quantum computing device 104, thereby facilitating quantum computation. As mentioned above, it can be desired to reduce a runtime and/or a computational cost associated with executing the quantum program 106 on the quantum computing device 104. In various aspects, the quantum measurement aggregation system 102 can facilitate such a reduction in runtime and/or computational cost of the quantum program 106 without substantively changing the quantum program 106, by re-formatting the quantum program 106 to have fewer quantum measurement instructions. As explained herein, the quantum measurement aggregation system 102 can facilitate this by swapping and/or merging quantum instructions in the quantum program according to an aggregation constraint, where the swap and/or merge operations reduce a number of quantum measurement instructions in the quantum program 106, and where the aggregation constraint ensures that the quantum program 106 is not substantively changed by such swap and/or merge operations.

In various embodiments, the quantum measurement aggregation system 102 can comprise a processor 108 (e.g., computer processing unit, microprocessor) and a computer-readable memory 110 that is operably connected to the processor 108. The memory 110 can store computer-executable instructions which, upon execution by the processor 108, can cause the processor 108 and/or other components of the quantum measurement aggregation system 102 (e.g., input component 112, aggregation component 114, execution component 116) to perform one or more acts. In various embodiments, the memory 110 can store computer-executable components (e.g., input component 112, aggregation component 114, execution component 116), and the processor 108 can execute the computer-executable components.

In various embodiments, the quantum measurement aggregation system 102 can comprise an input component 112. In various aspects, the input component 112 can electronically receive as input and/or can otherwise electronically access, from any suitable centralized and/or decentralized data structure, the quantum program 106. In other words, the input component 112 can, in various cases, electronically obtain and/or store a copy of the quantum program 106, and the quantum measurement aggregation system 102 can edit and/or re-format that copy so as to generate a version of the quantum program 106 that has a reduced number of quantum measurement instructions.

In various embodiments, the quantum measurement aggregation system 102 can comprise an aggregation component 114. In various aspects, the aggregation component 114 can electronically apply swap operations and/or merge operations to the copy of the quantum program 106 that is obtained by the input component 112, subject to an aggregation constraint. In various instances, the swap operations can involve switching the time slots of two adjacent quantum instructions. In various cases, the merge operations can involve placing two adjacent quantum measurement instructions into a single time slot. In various aspects, the aggregation constraint can stipulate that swap operations and/or merge operations can be applied only to quantum instructions that do not share qubits. In various instances, application of the swap operations and/or merge operations can have the effect of reducing a number of quantum measurement instructions in the quantum program 106 (e.g., in the copy of the quantum program 106 that is obtained by the input component 112). In various aspects, application of the aggregation constraint can have the effect of preventing the swap operations and/or merge operations from substantively changing the quantum program 106. In other words, abiding by the aggregation constraint can guarantee that the swap operations and/or merge operations re-format the quantum program 106 without altering the quantum computation achieved by the quantum program 106. Thus, the aggregation component 114 can be considered as editing the copy of the quantum program 106 that is obtained by the input component 112, so as to yield an optimized version of the quantum program 106.

In various embodiments, the quantum measurement aggregation system 102 can comprise an execution component 116. In various aspects, the execution component 116 can electronically execute on the quantum computing device 104 the optimized version of the quantum program 106 that is generated by the aggregation component 114. In other words, once the aggregation component 114 outputs a measurement-aggregated version of the quantum program 106, the execution component 116 can electronically cause the measurement-aggregated version of the quantum program 106 to run on and/or be executed by the quantum computing device 104. Because the measurement-aggregated version of the quantum program 106 can have fewer quantum measurement instructions than the unaltered version of the quantum program 106, the quantum computing device 104 can more quickly/efficiently run the measurement-aggregated version of the quantum program 106. Moreover, because the measurement-aggregated version of the quantum program 106 can be substantively equivalent to the unaltered version of the quantum program 106, the qubits of the quantum computing device 104 can undergo the same quantum state transformations when the measurement-aggregated version of the quantum program 106 is run as they would undergo if the unaltered version of the quantum program 106 is run.

At a high level, the input component 112 can access the quantum program 106, the aggregation component 114 can re-format the quantum program 106 to reduce a number of quantum measurement instructions without introducing substantive changes to the quantum program 106, and/or the execution component 116 can cause the re-formatted version of the quantum program 106 to be executed on the quantum computing device 104. In various aspects, such execution can consume less runtime and/or fewer computational resources than would execution of the original version of the quantum program 106. Thus, various embodiments of the invention can reduce waste of computational resources.

Figure 2:
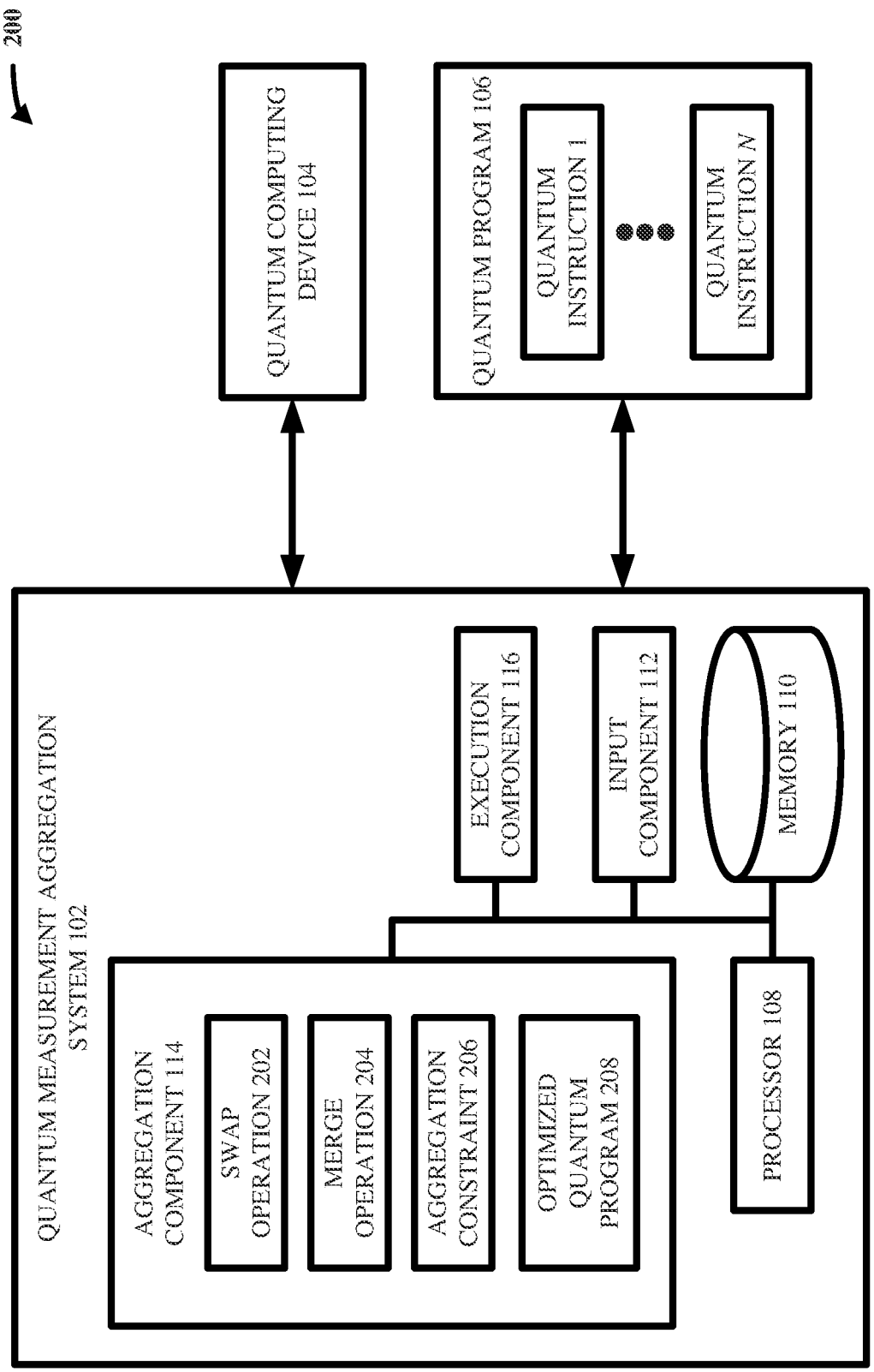
FIG. 2 illustrates a block diagram of an example, non-limiting system including a swap operation, a merge operation, and an aggregation constraint that facilitates measurement aggregation in quantum programs in accordance with one or more embodiments described herein.

FIG. 2 illustrates a block diagram of an example, non-limiting system 200 including a swap operation, a merge operation, and an aggregation constraint that can facilitate measurement aggregation in quantum programs in accordance with one or more embodiments described herein. As shown, the system 200 can, in some cases, comprise the same components as the system 100, and can further comprise a swap operation 202, a merge operation 204, and an aggregation constraint 206.

In various embodiments, as mentioned above, the input component 112 can electronically receive and/or otherwise electronically access the quantum program 106 (e.g., can obtain an electronic copy of the quantum program 106). In various aspects, the aggregation component 114 can then electronically edit and/or re-format the quantum program 106 (e.g., edit and/or re-format the electronic copy of the quantum program 106) by iteratively applying the swap operation 202 and/or the merge operation 204 to the quantum program 106 (e.g., to the copy of the quantum program 106) in accordance with the aggregation constraint 206.

In various instances, the swap operation 202 can involve switching the time slots of two adjacent quantum instructions in the quantum program 106. For instance, suppose that the quantum program 106 comprises the following quantum instructions: measure(0), S(1), measure(1). Upon execution on the quantum computing device 104, the quantum program 106 would first measure the state of qubit 0, then apply a Phase gate to qubit 1, and finally measure the state of qubit 1. If the swap operation 202 is applied to the measure(0) and the S(1), which are adjacent (e.g., which are next to each other in series), the measure(0) and the S(1) can switch places with each other in the quantum program 106. Thus, after application of the swap operation 202, the quantum program 106 can now read as follows: S(1), measure(0), measure(1). In such case, upon execution on the quantum computing device 104, the quantum program 106 would first apply a Phase gate to qubit 1, then measure the state of qubit 0, and finally measure the state of qubit 1.

In various aspects, the merge operation 204 can involve combining two adjacent quantum measurement instructions listed in the quantum program 106 into a single time slot. For instance, consider again the example above, where the quantum program 106 reads as follows: S(1), measure(0), measure(1). If the merge operation 204 is applied to the measure(0) and the measure(1), which are adjacent (e.g., which are next to each other in series), the measure(0) and the measure(1) can be combined into one time slot rather than two separate time slots. Thus, after application of the merge operation 204, the quantum program 106 can read as follows: S(1), measure(0,1). In such case, upon execution on the quantum computing device 104, the quantum program 106 can first apply a Phase gate to qubit 1 and can then simultaneously measure the state of qubit 0 and the state of qubit 1. In other words, the merge operation 204 can cause the measure(0) and the measure(1) to be parallelized rather than serialized (e.g., to be executed in parallel rather than executed in series).

In various cases, the aggregation constraint 206 can specify that the swap operation 202 and/or the merge operation 204 can be applied only on adjacent quantum instructions that do not share qubits. As explained above, a quantum instruction can operate on one or more qubits. If the set of qubits on which one quantum instruction operates have a non-zero intersection with the set of qubits on which another quantum instruction operates, those two quantum instructions can be considered as sharing qubits. However, if the set of qubits on which one quantum instruction operates instead have a null intersection with the set of qubits on which another quantum instruction operates, the two quantum instructions can be considered as not sharing qubits. For example, consider the following quantum instructions: measure(0) and S(1). Measure(0) operates on qubit 0, and S(1) operates on qubit 1. Since the set containing qubit 0 has a null intersection with the set containing qubit 1, measure(0) and S(1) do not share qubits. As another example, consider the following quantum instructions: measure(0,1) and S(1). Measure(0,1) operates on qubit 0 and qubit 1, and S(1) operates on qubit 1. Since the set containing qubit 0 and qubit 1 has a non-zero intersection with the set containing qubit 1, measure(0,1) and S(1) share qubits.

In various cases, the aggregation component 114 can repetitively apply the swap operation 202 and/or the merge operation 204 to the quantum program 106 in accordance with the aggregation constraint 206, thereby yielding an optimized quantum program 208. In various aspects, iterative application of the swap operation 202 and/or the merge operation 204 can cause the optimized quantum program 208 to have fewer quantum measurement instructions as compared to the quantum program 106. Accordingly, the optimized quantum program 208 can have a shorter runtime and/or can consume fewer computational resources when executed as compared to the quantum program 106. Moreover, in various instances, obeying the aggregation constraint 206 can guarantee that the optimized quantum program 208 is substantively equivalent to the quantum program 106. In other words, when executed on the quantum computing device 104, the optimized quantum program 208 can facilitate the same qubit transformations as the quantum program 106. So, the optimized quantum program 208 can be considered as a version of the quantum program 106 that has been re-formatted for computational efficiency.

In short, the input component 112 can electronically access the quantum program 106, and the aggregation component 114 can iteratively edit and/or re-format (e.g., by applying the swap operation 202 and/or the merge operation 204 in accordance with the aggregation constraint 206) the quantum program 106, thereby resulting in the optimized quantum program 208. In various embodiments, the execution component 116 can electronically execute and/or can otherwise electronically cause the optimized quantum program 208 to be executed on the quantum computing device 104.

FIGS. 3-8 illustrate flow diagrams of example, non-limiting computer-implemented methods 300-800 that can facilitate measurement aggregation in quantum programs in accordance with one or more embodiments described herein. In other words, FIGS. 3-8 collectively depict a step-by-step algorithm which the aggregation component 114 can perform on the quantum program 106 in order to facilitate measurement aggregation.

Figure 3:
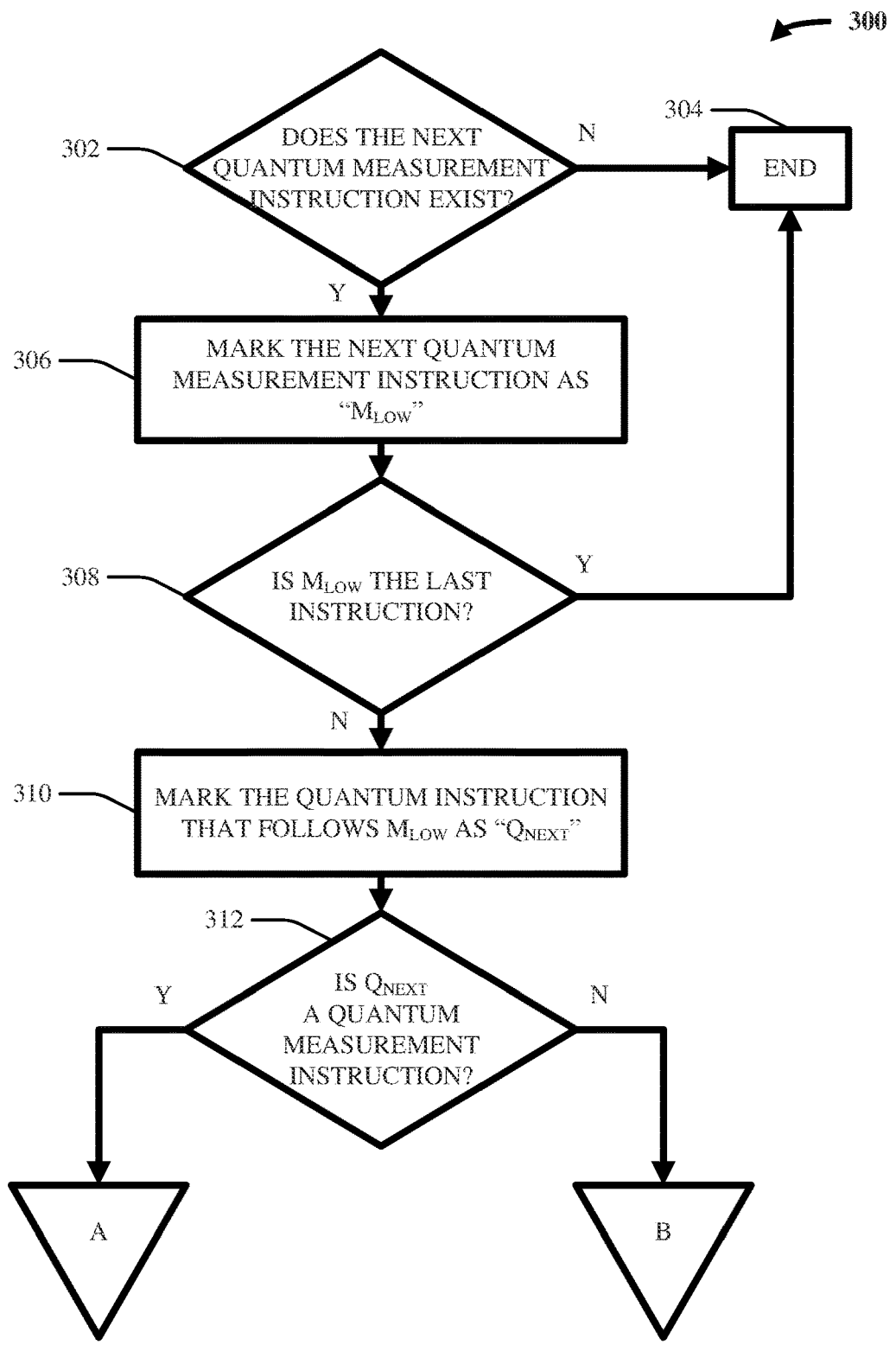
FIGS. 3-8 illustrate flow diagrams of example, non-limiting computer-implemented methods that facilitate measurement aggregation in quantum programs in accordance with one or more embodiments described herein.

FIG. 3 illustrates that such a step-by-step algorithm can begin at act 302. As shown, in various embodiments, act 302 can include determining, by the aggregation component 114, whether a next quantum measurement instruction exists in the quantum program 106. As explained above, the quantum program 106 can be organized in chronological order (e.g., such that time flows from left to right and/or from top to bottom). If the next quantum measurement instruction does not exist in the quantum program 106 (e.g., if the quantum program 106 does not contain any quantum measurement instructions), the aggregation component 114 can proceed to act 304. However, if the next quantum measurement instruction does exist in the quantum program 106, the aggregation component 114 can proceed to act 306.

In various aspects, act 304 can include ending the step-by-step algorithm. In other words, the aggregation component 114 can output the optimized quantum program 208 at act 304. In still other words, when act 304 is reached, all swapping and/or merging in accordance with the aggregation constraint 206 that could be performed on the quantum program 106 will have been performed, and the resulting version of the quantum program 106 can be considered as the optimized quantum program 208.

In various instances, act 306 can include marking/labelling, by the aggregation component 114, the next quantum measurement instruction as "$m_{low}$." As shown, the aggregation component 114 can proceed to act 308.

In various cases, act 308 can include determining, by the aggregation component 114, whether $m_{low}$ is the last quantum instruction in the quantum program 106. If $m_{low}$ is the last quantum instruction in the quantum program 106, the aggregation component 114 can proceed to act 304. However, if $m_{low}$ is not the last quantum instruction in the quantum program 106, the aggregation component 114 can proceed to act 310.

In various embodiments, act 310 can include marking/labelling, by the aggregation component 114, the quantum instruction that immediately follows $m_{low}$ as "$q_{next}$." That is, $q_{next}$ can be the adjacent quantum instruction that occupies the time slot immediately after $m_{low}$.

Figure 4:
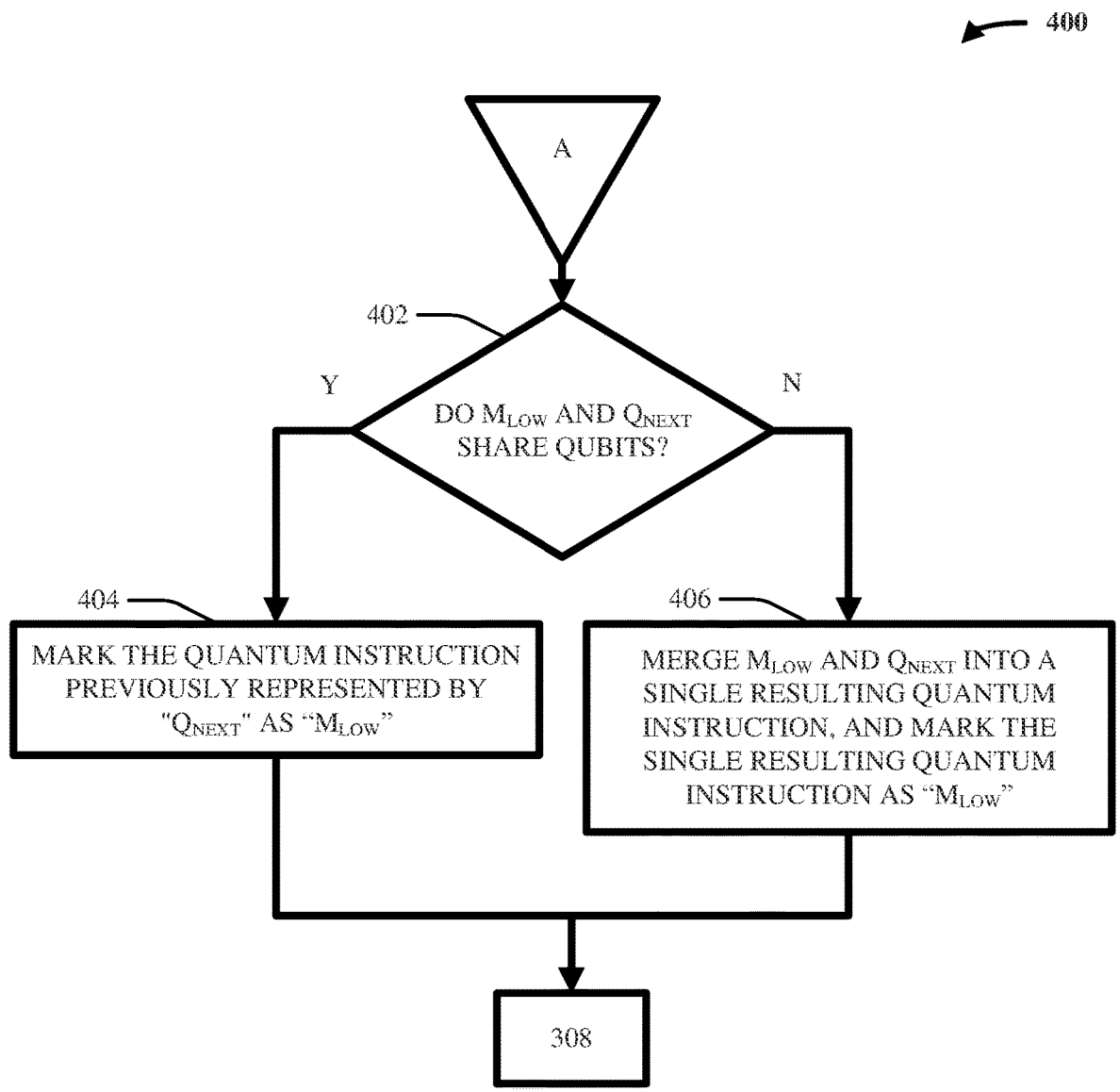
Figure 5:
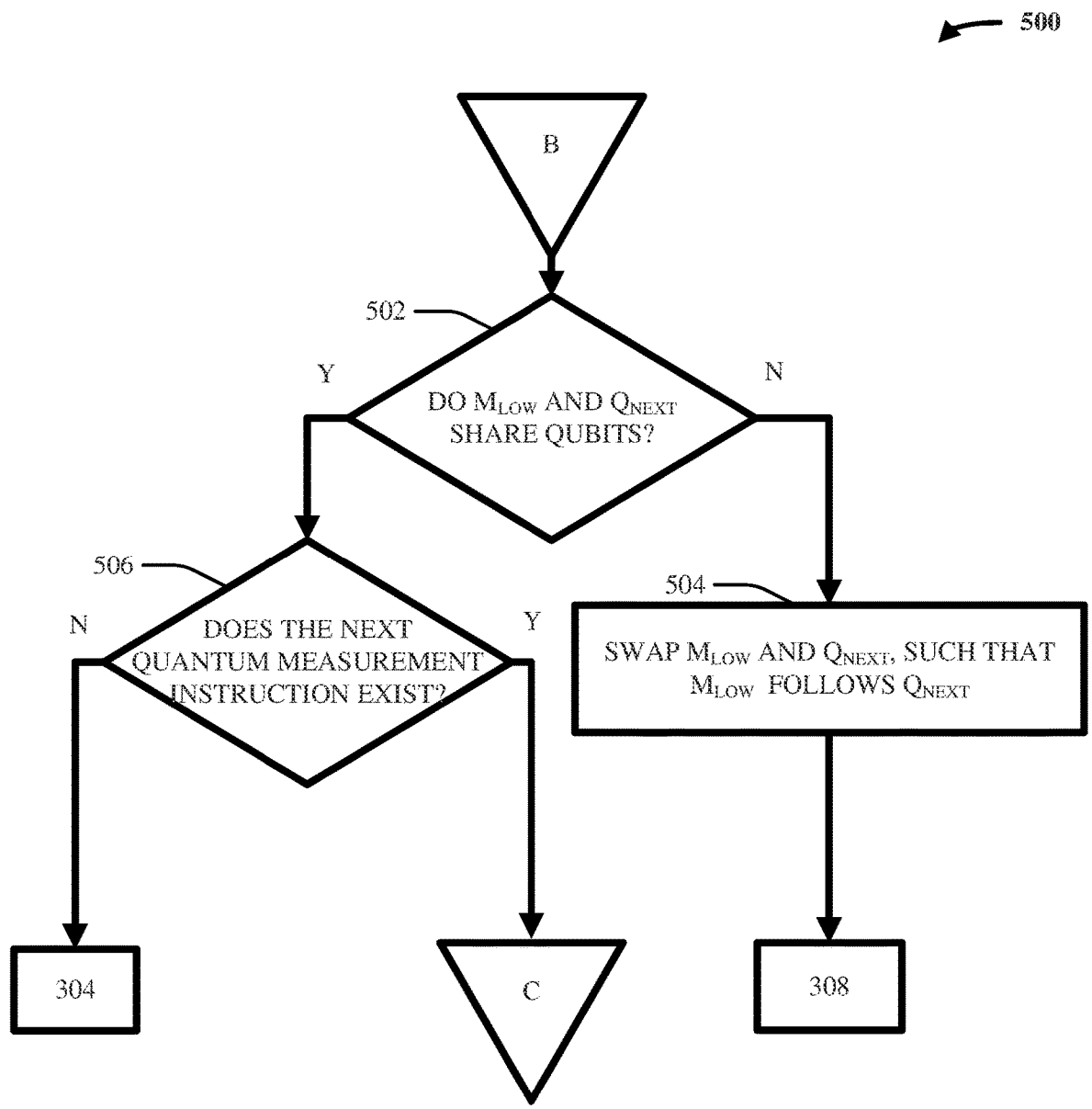

In various aspects, act 312 can include determining, by the aggregation component 114, whether $q_{next}$ is a quantum measurement instruction. If $q_{next}$ is a quantum measurement instruction, the aggregation component 114 can proceed to branch A, which is depicted in FIG. 4. Instead, if $q_{next}$ is not a quantum measurement instruction, the aggregation component 114 can proceed to branch B, which is depicted in FIG. 5.

As shown in FIG. 4, branch A can begin with act 402. In various instances, act 402 can include determining, by the aggregation component 114, whether $m_{low}$ and $q_{next}$ share qubits. If $m_{low}$ and $q_{next}$ do share qubits, the aggregation component 114 can proceed to act 404. Instead, if $m_{low}$ and $q_{next}$ do not share qubits, the aggregation component 114 can proceed to act 406.

In various cases, act 404 can include marking/labelling, by the aggregation component 114, the quantum instruction that was previously represented by "$q_{next}$" as "$m_{low}$," and the aggregation component 114 can return back to act 308. In other words, if $m_{low}$ and $q_{next}$ are both quantum measurement instructions that share qubits, neither the swap operation 202 nor the merge operation 204 can be applied to them, per the aggregation constraint 206.

In various aspects, act 406 can include merging, by the aggregation component 114, $m_{low}$ and $q_{next}$ into a single resulting quantum instruction, and marking, by the aggregation component 114, the single resulting quantum instruction as "$m_{low}$." In other words, if $m_{low}$ and $q_{next}$ are both quantum measurement instructions that do not share qubits, the merge operation 204 can be applied to them, per the aggregation constraint 206. The aggregation component 114 can then return back to act 308.

As shown in FIG. 5, branch B can begin with act 502. In various instances, act 502 can include determining, by the aggregation component 114, whether $m_{low}$ and $q_{next}$ share qubits. If $m_{low}$ and $q_{next}$ do not share qubits, the aggregation component 114 can proceed to act 504. Instead, if $m_{low}$ and $q_{next}$ do share qubits, the aggregation component 114 can proceed to act 506.

In various cases, act 504 can include swapping $m_{low}$ and $q_{next}$ such that mew follows $q_{next}$. In other words, if $q_{next}$ is not a quantum measurement instruction, and if $q_{next}$ and $m_{low}$ do not share qubits, the swap operation 202 can be applied to $q_{next}$ and $m_{low}$, per the aggregation constraint 206. The aggregation component 114 can then return back to act 308.

In various aspects, act 506 can include determining, by the aggregation component 114, whether the next quantum measurement instruction exists in the quantum program 106. In other words, if $q_{next}$ is not a quantum measurement instruction, and if $q_{next}$ and $m_{low}$ share qubits, neither the swap operation 202 nor the merge operation 204 can be applied to them, per the aggregation constraint 206. If the next quantum instruction does not exist in the quantum program 106, the aggregation component 114 can proceed to act 304. However, if the next quantum instruction does exist in the quantum program 106, the aggregation component 114 can proceed to branch C, shown in FIG. 6.

Figure 6:
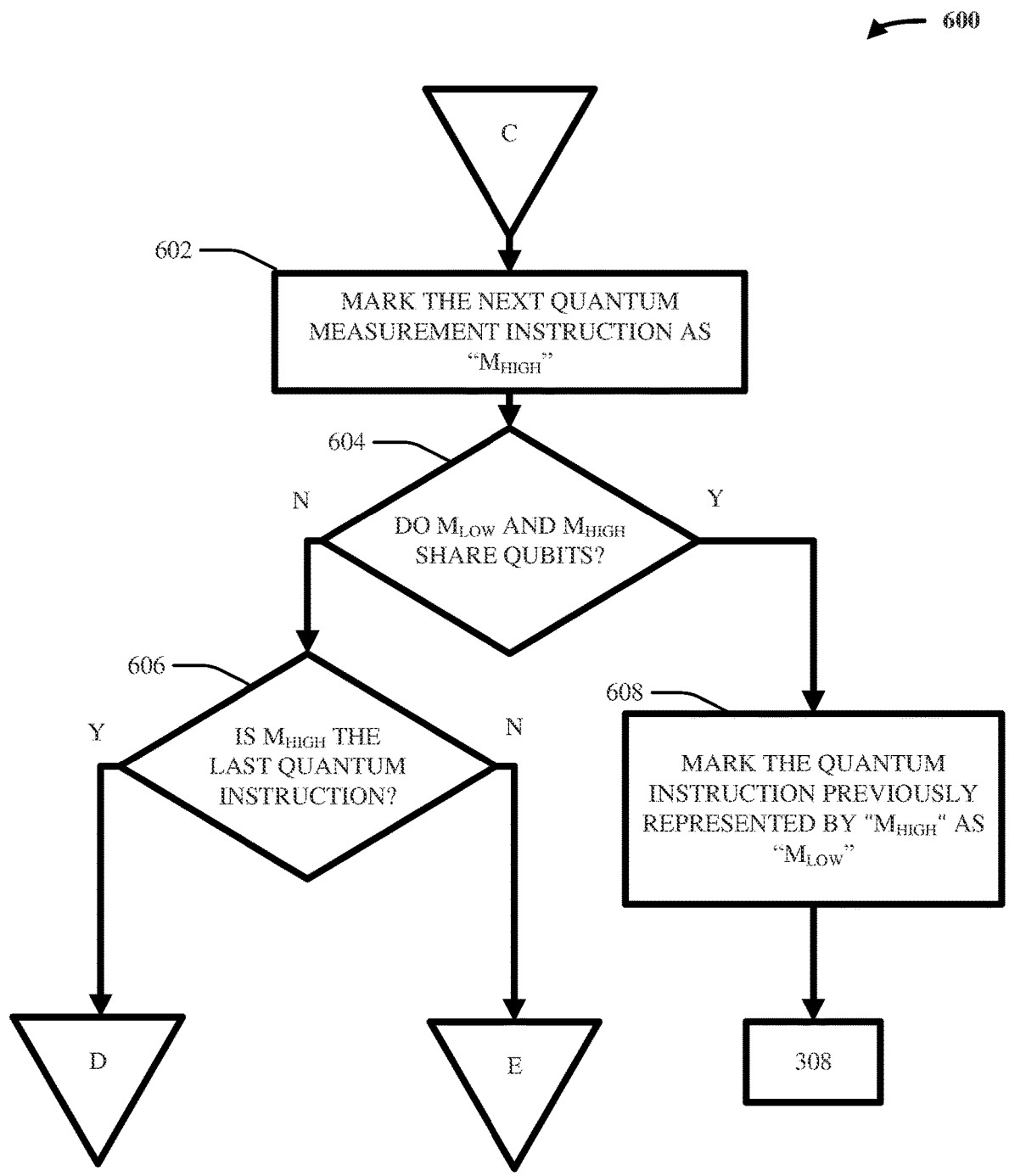

As shown in FIG. 6, branch C can begin with act 602. In various instances, act 602 can include marking/labelling, by the aggregation component 114, the next quantum measurement instruction as "$m_{high}$." The aggregation component 114 can then proceed to act 604.

In various aspects, act 604 can include determining, by the aggregation component 114, whether $m_{low}$ and $m_{high}$ share qubits. If $m_{low}$ and $m_{high}$ do not share qubits, the aggregation component 114 can proceed to act 606. Instead, if $m_{low}$ and $m_{high}$ do share qubits, the aggregation component 114 can proceed to act 608.

In various cases, act 606 can include determining, by the aggregation component 114, whether $m_{high}$ is the last quantum instruction in the quantum program 106. If so, the aggregation component 114 can proceed to branch D, shown in FIG. 7. If not, the aggregation component 114 can proceed to branch E, shown in FIG. 8.

In various instances, act 608 can include marking/labelling, by the aggregation component 114, the quantum instruction that was previously represented by "$m_{high}$" as "$m_{low}$." The aggregation component 114 can then return back to act 308.

Figure 7:
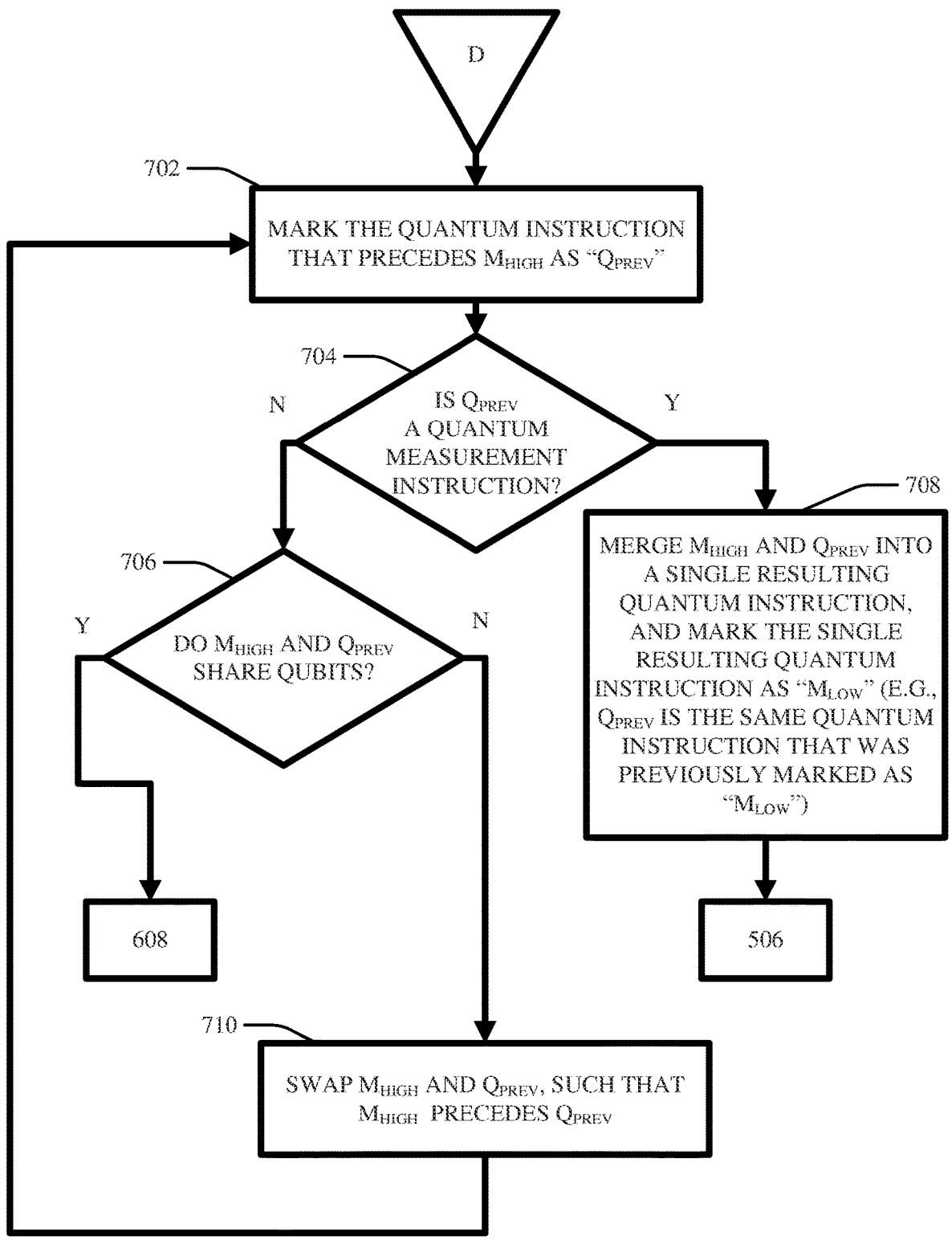

As shown in FIG. 7, branch D can begin with act 702. In various cases, act 702 can include marking/labelling, by the aggregation component 114, the quantum instruction that immediately precedes $m_{high}$ as "$q_{prev}$." The aggregation component 114 can then proceed to act 704.

In various aspects, act 704 can include determining, by the aggregation component 114, whether $q_{prev}$ a is a quantum measurement instruction. If $q_{prev}$ is not a quantum measurement instruction, the aggregation component 114 can proceed to act 706. However, if $q_{prev}$ is a quantum measurement instruction, the aggregation component 114 can proceed to act 708.

In various cases, act 706 can include determining, by the aggregation component 114, whether $m_{high}$ and $q_{prev}$ share qubits. If $m_{high}$ and $q_{prev}$ do share qubits, the aggregation component 114 can proceed to act 608 (e.g., if $m_{high}$ and $q_{prev}$ share qubits, they can be neither swapped nor merged, per the aggregation constraint 206). However, if $m_{high}$ and $q_{prev}$ do not share qubits, the aggregation component 114 can proceed to act 710.

In various instances, act 710 can include swapping, by the aggregation component 114, $m_{high}$ and $q_{prev}$, such that $m_{high}$ now precedes $q_{prev}$ (e.g., if $q_{prev}$ is not a quantum measurement instruction, and if $q_{prev}$ and $m_{high}$ do not share qubits, then $q_{prev}$ and $m_{high}$ can be swapped, per the aggregation constraint 206). The aggregation component 114 can then return back to act 702.

In various aspects, act 708 can include merging, by the aggregation component 114, $m_{high}$ and $q_{prev}$ into a single resulting quantum instruction, and marking/labelling, by the aggregation component 114, the single resulting quantum instruction as "$m_{low}$." In such case, it happens that $q_{prev}$ can be the same quantum instruction that was previously marked as $m_{low}$. Thus, in such case, $q_{prev}$ and $m_{high}$ are both quantum measurement instructions that do not share qubits, and so the merge operation 204 can be applied, per the aggregation constraint 206. The aggregation component 114 can then proceed to act 506.

Figure 8:
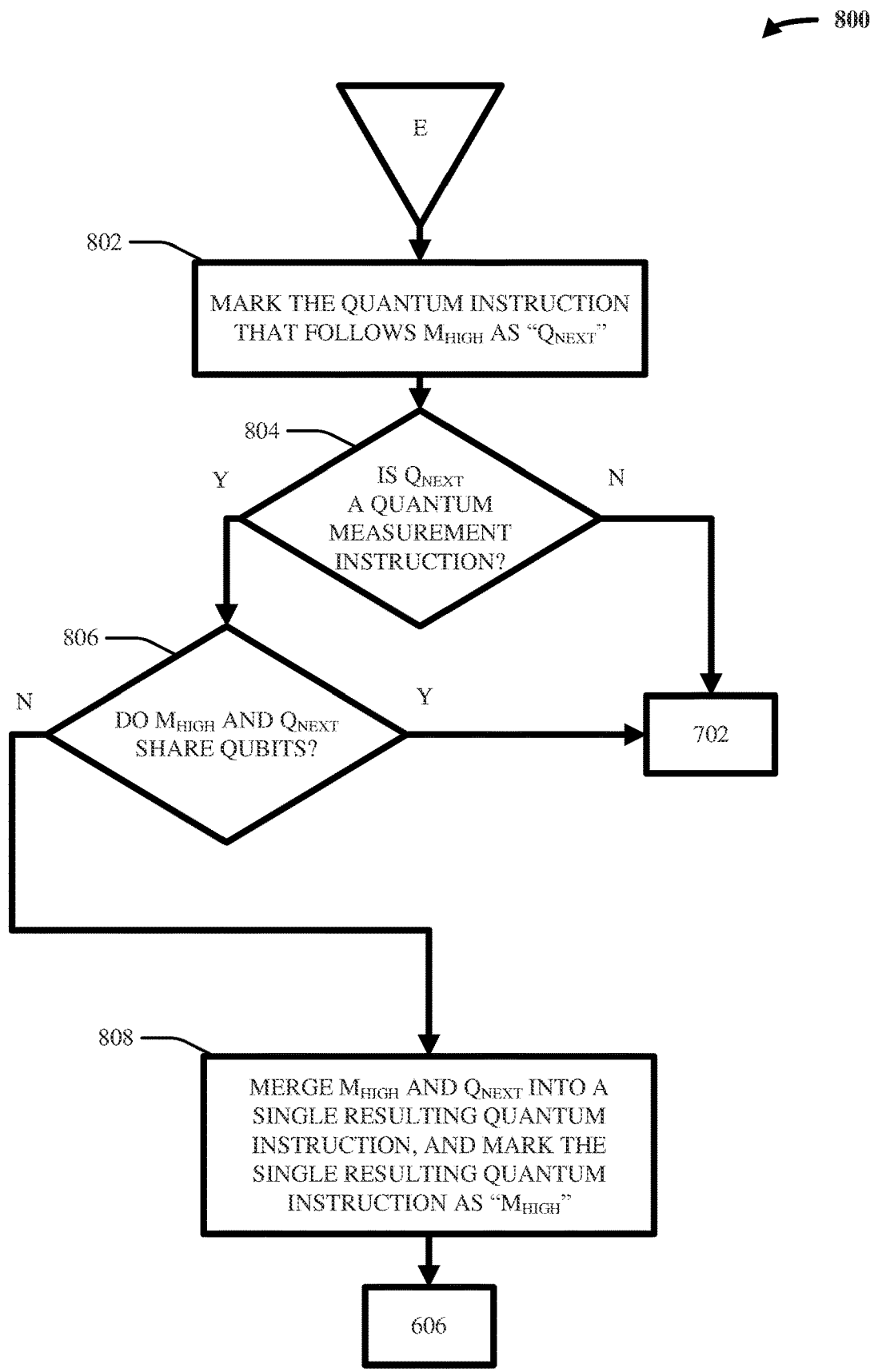

As shown in FIG. 8, branch E can begin with act 802. In various cases, act 802 can include marking/labelling, by the aggregation component 114, the quantum instruction that immediately follows $m_{high}$ as "$q_{next}$." The aggregation component 114 can then proceed to act 804.

In various embodiments, act 804 can include determining, by the aggregation component 114, whether $q_{next}$ next is a quantum measurement instruction. If not, the aggregation component 114 can proceed to act 702. If so, the aggregation component 114 can proceed to act 806.

In various instances, act 806 can include determining, by the aggregation component 114, whether $m_{high}$ and $q_{next}$ share qubits. If so, the aggregation component 114 can proceed to act 702. If not, the aggregation component 114 can proceed to act 808.

In various cases, act 808 can include merging, by the aggregation component 114, $m_{high}$ and $q_{next}$ into a single resulting quantum instruction, and marking/labelling, by the aggregation component 114, the single resulting quantum instruction as "$m_{high}$." In such case, $m_{high}$ and $q_{next}$ are both quantum measurement instructions that do not share qubits, and so the merge operation 204 can be applied, per the aggregation constraint 206. The aggregation component 114 can then proceed to act 606.

In various embodiments, the step-by-step algorithm depicted in FIGS. 3-8 illustrates the specific decisions and/or edits which can be iteratively made by the aggregation component 114 in order to aggregate quantum measurement instructions in the quantum program 106. At some point, the aggregation component 114 proceeds to act 304, at which the resulting version of the quantum program 106 can be considered as the optimized quantum program 208.

Those having ordinary skill in the art will appreciate that the particular quantum instruction labels discussed herein (e.g., "$m_{low}$," "$m_{high}$," "$q_{next}$," "$q_{prev}$") are non-limiting examples that are included for the purpose of illustration. Such labels, as used herein, act as indices and/or placeholders that make it easier to describe/illustrate the herein-disclosed algorithms.

FIGS. 9-16 illustrate a non-limiting example of how measurement aggregation in quantum programs can be facilitated in accordance with one or more embodiments described herein. In other words, FIGS. 9-16 show an illustrative example of how the step-by-step algorithm of FIGS. 3-8 can be implemented.

Figure 9:
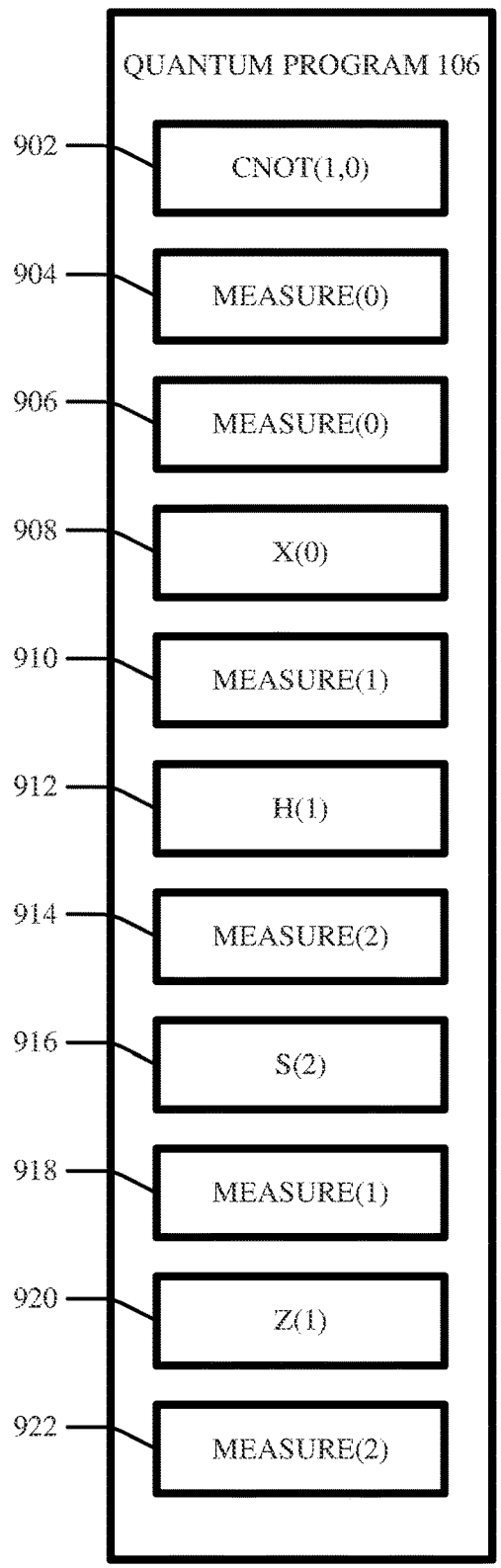
FIGS. 9-16 illustrate a non-limiting example of how measurement aggregation in quantum programs can be facilitated in accordance with one or more embodiments described herein.

FIG. 9 depicts a non-limiting embodiment of the quantum program 106. In this example, the quantum program 106 can comprise eleven quantum instructions (e.g., 902 to 922). As shown, the quantum instruction 902 can be CNOT(1,0), which indicates a controlled-not gate where qubit 1 is the target and qubit 0 is the control. The quantum instruction 904 can be measure(0), which indicates measuring the state of qubit 0. In various cases, the quantum instruction 906 can be another measure(0). In various instances, the quantum instruction 908 can be X(0), which indicates a Pauli-X gate applied to qubit 0. In various aspects, the quantum instruction 910 can be measure(1), which indicates measuring the state of qubit 1. In various cases, the quantum instruction 912 can be H(1), which indicates applying a Hadamard gate to qubit 1. In various instances, the quantum instruction 914 can be measure(2), which indicates measuring the state of qubit 2. In various cases, the quantum instruction 916 can be S(2), which indicates applying a Phase gate to qubit 2. In various aspects, the quantum instruction 918 can be measure (1). In various instances, the quantum instruction 920 can be Z(1), which indicates applying a Pauli-Z gate to qubit 1. Finally, in various cases, the quantum instruction 922 can be measure(2).

As shown, the quantum program 106 in this example can include six separate quantum measurement instructions (e.g., 904, 906, 910, 914, 918, and 922). In various aspects, the step-by-step algorithm depicted in FIGS. 3-8 can be applied to the quantum program 106, so as to reduce this number of quantum measurement instructions.

The aggregation component 114 can begin at act 302. At act 302, the aggregation component 114 can determine that the next quantum measurement instruction does exist; specifically, the quantum instruction 904 is the next quantum measurement instruction in the quantum program 106. Thus, the aggregation component 114 can mark, label, and/or otherwise consider the quantum instruction 904 as "$m_{low}$," per act 306. The aggregation component 114 can then determine that $m_{low}$ (e.g., 904) is not the last instruction in the quantum program 106, per act 308. Accordingly, the aggregation component 114 can mark, label, and/or otherwise consider the quantum instruction 906 as "$q_{next}$," per act 310 (e.g., 906 immediately follows 904). Then, the aggregation component 114 can determine that $q_{next}$ (e.g., 906) is a quantum measurement instruction, per act 312. Thus, the aggregation component 114 can proceed to branch A.

At act 402, the aggregation component 114 can determine that $m_{low}$ (e.g., 904) and $q_{next}$ (e.g., 906) share qubits (e.g., they both operate on qubit 0). Thus, the aggregation component 114 can mark, label, and/or otherwise consider the quantum instruction 906 as "$m_{low}$," per act 404 (e.g., the quantum instruction 906 was previously labeled as "$q_{next}$"), and the aggregation component 114 can go back to act 308. Since $m_{low}$ (e.g., 906) is not the last quantum instruction in the quantum program 106, the aggregation component 114 can label, mark, and/or otherwise consider the quantum instruction 908 as "$q_{next}$," per act 310 (e.g., the quantum instruction 908 immediately follows the quantum instruction 906). The aggregation component 114 can then determine that $q_{next}$ (e.g., 908) is not a quantum measurement instruction (e.g., the quantum instruction 908 is X(0)), and so the aggregation component 114 can proceed to branch B.

At act 502, the aggregation component 114 can determine that $m_{low}$ (e.g., 906) and $q_{next}$ (e.g., 908) share qubits (e.g., they both operate on qubit 0). Thus, the aggregation component 114 can determine that the next quantum measurement instruction (e.g., the quantum instruction 910) exists, and can thus proceed to branch C.

At act 602, the aggregation component 114 can mark, label, and/or otherwise consider the quantum instruction 910 as "$m_{high}$." In various cases, the aggregation component 114 can determine that $m_{low}$ (e.g., 906) and $m_{high}$ (e.g., 910) do not share qubits (e.g., 906 operates on qubit 0, while 910 operates on qubit 1), per act 604. Then, the aggregation component 114 can determine that $m_{high}$ (e.g., 910) is not the last quantum instruction in the quantum program 106, per act 606. Thus, the aggregation component 114 can proceed to branch E.

At act 802, the aggregation component 114 can mark, label, and/or otherwise consider the quantum instruction 912 as "$q_{next}$" (e.g., 912 immediately follows 910). The aggregation component 114 can then determine that $q_{next}$ (e.g., 912) is not a measurement instruction (e.g., 912 is H(1)), per act 804, and the aggregation component 114 can proceed to act 702. At act 702, the aggregation component 114 can mark, label, and/or otherwise consider the quantum instruction 908 as "$q_{prev}$," (e.g., 908 immediately precedes 910). The aggregation component 114 can then determine that $q_{prev}$ (e.g., 908) is not a quantum measurement instruction, per act 704. In various aspects, the aggregation component 114 can determine that $m_{high}$ (e.g., 910) and $q_{prev}$ (e.g., 908) do not share qubits (e.g., 908 operates on qubit 0, while 910 operates on qubit 1), per act 706. Thus, the aggregation component 114 can swap $m_{high}$ (e.g., 910) and $q_{prev}$ (e.g., 908), such that $m_{high}$ now precedes $q_{prev}$. This is illustrated in FIG. 10.

Figure 10:
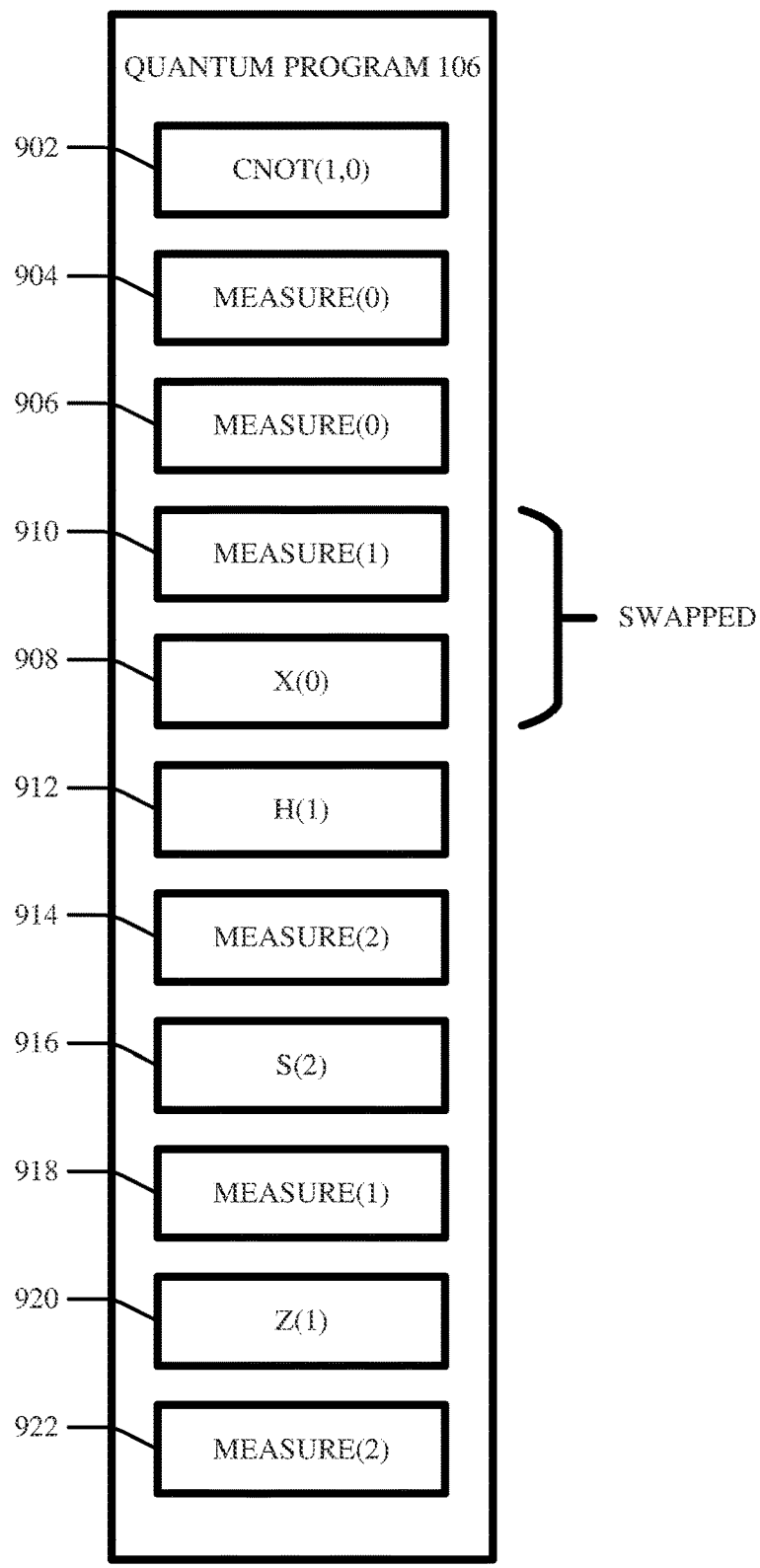
Figure 11:
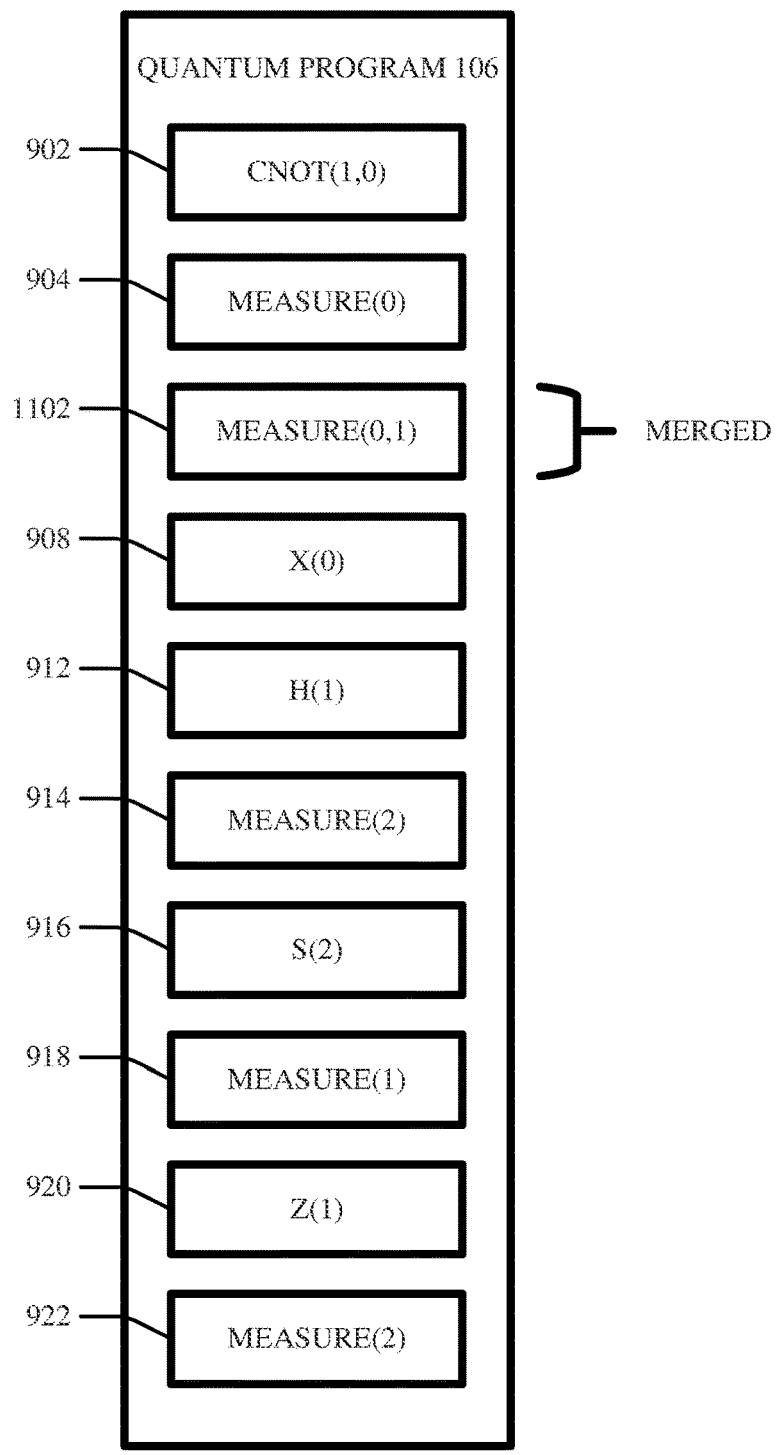

The aggregation component 114 can return back to act 702, where it can mark, label, and/or otherwise consider the quantum instruction 906 as $q_{prev}$ (e.g., 906 now immediately precedes 910, as shown in FIG. 10). The aggregation component 114 can then determine that $q_{prev}$ (e.g., 906) is a quantum measurement instruction (e.g., 906 is measure(0)), per act 704. Thus, the aggregation component 114 can merge $m_{high}$ (e.g., 910) and $q_{prev}$ (e.g., 906) into a single resulting quantum instruction, as shown in FIG. 11. That is, the quantum instruction 1102 can be the result of merging the quantum instruction 906 and the quantum instruction 910 (e.g., 906 was measure(0) and 910 was measure(1); thus, 1102 is measure(0,1)). The aggregation component 114 can mark, label, and/or otherwise consider the quantum instruction 1102 as "$m_{low}$," per act 708, and the aggregation component 114 can go to act 506.

At act 506, the aggregation component 114 can determine that the next quantum measurement instruction exists (e.g., the quantum instruction 914 is the next quantum measurement instruction after 1102). Thus, the aggregation component 114 can proceed to branch C. Per act 602, the aggregation component 114 can mark, label, and/or otherwise consider the quantum instruction 914 as "$m_{high}$." Then, the aggregation component 114 can determine that $m_{high}$ (e.g., 914) and $m_{low}$ (e.g., 1102) do not share qubits (e.g., 1102 operates on qubit 0 and qubit 1, while 914 operates on qubit 2). Next, the aggregation component 114 can determine that $m_{high}$ (e.g., 914) is not the last quantum instruction in the quantum program 106, per act 606, and so the aggregation component 114 can proceed to branch E.

Figure 12:
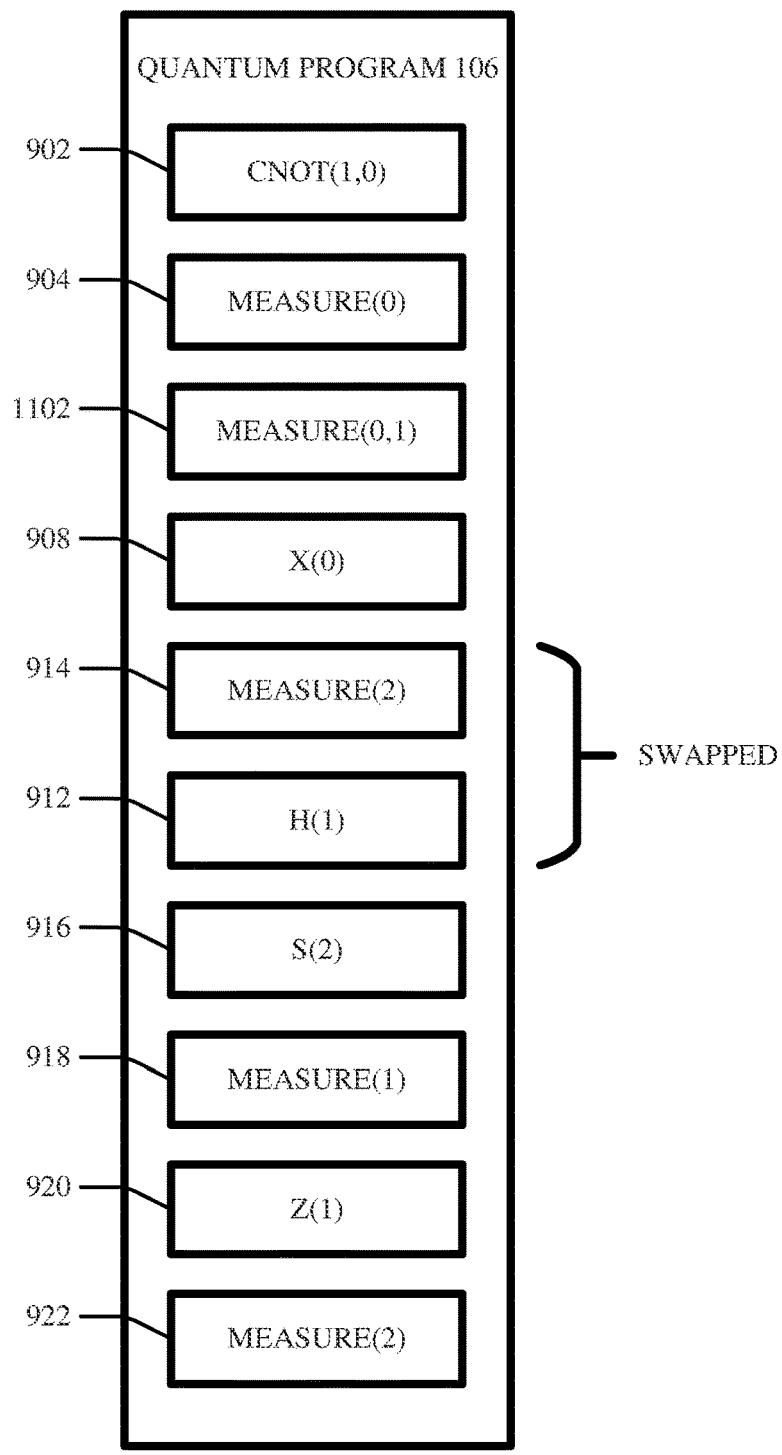

At act 802, the aggregation component 114 can mark, label, and/or otherwise consider the quantum instruction 916 as "$q_{next}$" (e.g., 916 immediately follows 914). The aggregation component 114 can then determine that $q_{next}$ (e.g., 916) is not a quantum measurement instruction (e.g., 916 is S(2)), per act 804. Thus, the aggregation component 114 can proceed to act 702. At act 702, the aggregation component 114 can mark, label, and/or otherwise consider the quantum instruction 912 as "$q_{prev}$," (e.g., 912 immediately precedes 914). The aggregation component 114 can then determine that $q_{prev}$ (e.g., 912) is not a quantum measurement instruction (e.g., 912 is H(1)), per act 704. Then, the aggregation component 114 can determine that $m_{high}$ (e.g., 914) and $q_{prev}$ (e.g., 912) do not share qubits (e.g., 914 operates on qubit 2, while 912 operates on qubit 1), per act 706. Thus, the aggregation component 114 can swap $m_{high}$ (e.g., 914) with $q_{prev}$ (e.g., 912), per act 710. This is shown in FIG. 12.

Figure 13:
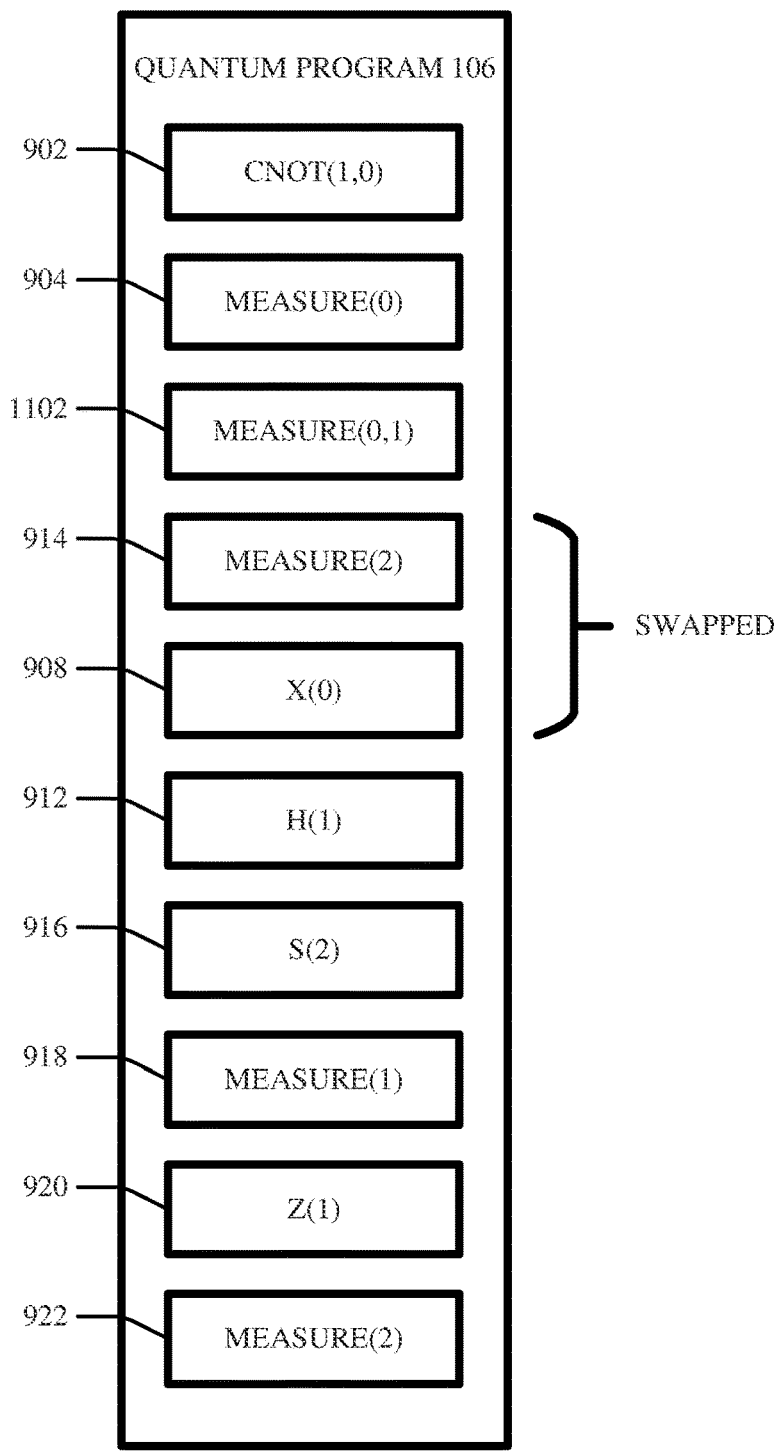

The aggregation component 114 can return to act 702, and can thus mark, label, and/or otherwise consider the quantum instruction 908 as "$q_{prev}$" (e.g., 908 now immediately precedes 914). The aggregation component 114 can then determine that $q_{prev}$ (e.g., 908) is not a quantum measurement instruction (e.g., 908 is X(0)), per act 704. Then, the aggregation component 114 can determine that $m_{high}$ (e.g., 914) and $q_{prev}$ (e.g., 908) do not share qubits (e.g., 914 operates on qubit 2, while 908 operates on qubit 0), per act 706. Thus, the aggregation component 114 can swap $m_{high}$ (e.g., 914) with $q_{prev}$ (e.g., 908), per act 710. This is shown in FIG. 13.

Figure 14:
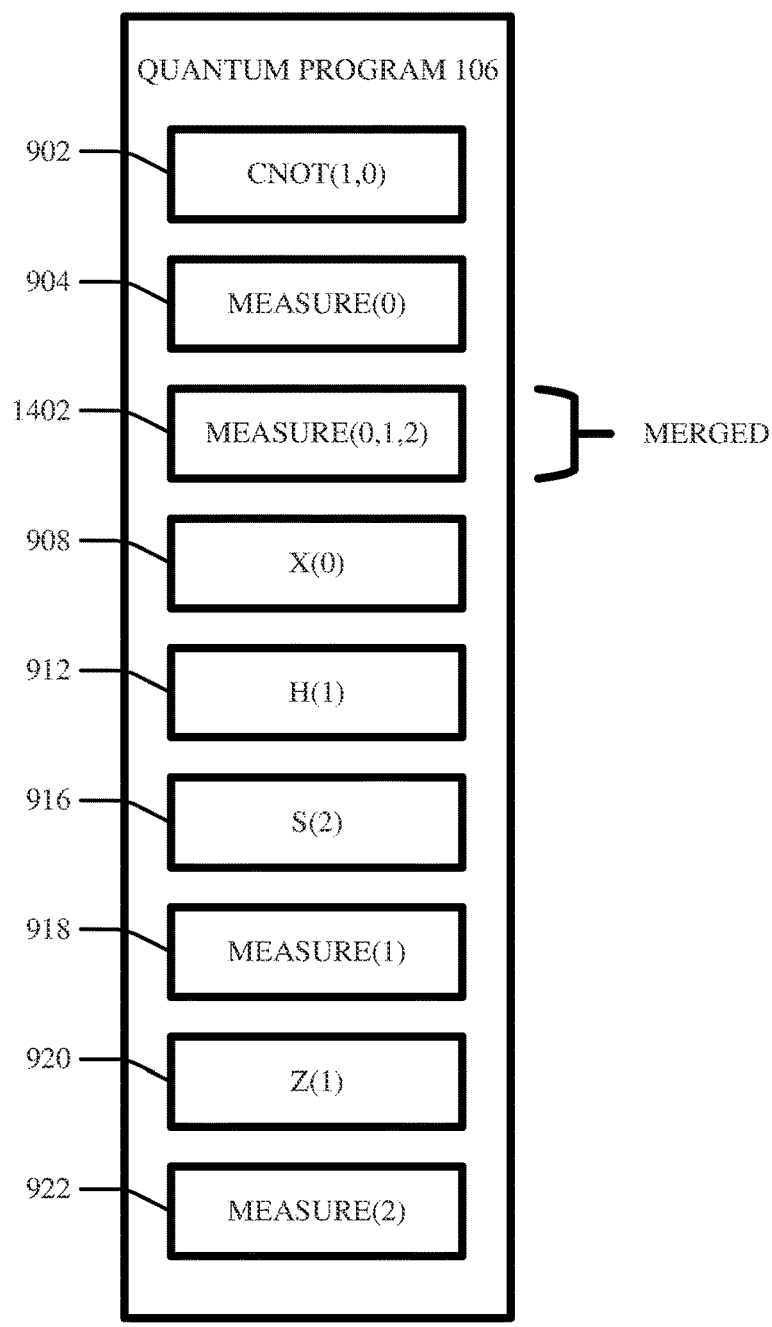

The aggregation component 114 can return to act 702, and can thus mark, label, and/or otherwise consider the quantum instruction 1102 as "$q_{prev}$" (e.g., 1102 now immediately precedes 914). The aggregation component 114 can next determine that $q_{prev}$ (e.g., 1102) is a quantum measurement instruction (e.g., 1102 is measure(0,1)), per act 704. So, the aggregation component 114 can merge $m_{high}$ (e.g., 914) and $q_{prev}$ (e.g., 1102) into a single resulting quantum instruction, as shown in FIG. 14. That is, the quantum instruction 1402 can be the result of merging the quantum instruction 914 and the quantum instruction 1102 (e.g., 1102 was measure(0,1) and 914 was measure(2); thus, 1402 is measure(0,1,2)). The aggregation component 114 can mark, label, and/or otherwise consider the quantum instruction 1402 as "$m_{low}$," per act 708, and the aggregation component 114 can go to act 506.

At act 506, the aggregation component 114 can determine that the next quantum measurement instruction exists (e.g., the quantum instruction 918 is the next quantum measurement instruction after 1402). Thus, the aggregation component 114 can proceed to branch C. Per act 602, the aggregation component 114 can mark, label, and/or otherwise consider the quantum instruction 918 as "$m_{high}$." Then, the aggregation component 114 can determine that $m_{high}$ (e.g., 918) and $m_{low}$ (e.g., 1402) do share qubits (e.g., 1402 operates on qubit 0, qubit 1, and qubit 2, while 918 operates on qubit 1). So, the aggregation component 114 can mark, label, and/or otherwise consider the quantum instruction 918 as "$m_{low}$" (e.g., 918 was previously labeled as "$m_{high}$"), per act 608. The aggregation component can then proceed to act 308.

At act 308, the aggregation component 114 can determine that $m_{low}$ (e.g., 918) is not the last quantum instruction in the quantum program 106. So, the aggregation component 114 can mark, label, and/or otherwise consider the quantum instruction 920 as "$q_{next}$" (e.g., 920 immediately follows 918), per act 310. Then, the aggregation component 114 can determine that $q_{next}$ (e.g., 920) is not a quantum measurement instruction (e.g., 920 is Z(1)), per act 312. Thus, the aggregation component can proceed to branch B.

At act 502, the aggregation component 114 can determine that $m_{low}$ (e.g., 918) and $q_{next}$ (e.g., 920) do share qubits (e.g., they both operate on qubit 1). Then, the aggregation component 114 can determine that the next quantum measurement instruction does exist (e.g., the quantum instruction 922 is the next quantum measurement instruction after 918), per act 506. So, the aggregation component 114 can proceed to branch C.

At act 602, the aggregation component 114 can mark, label, and/or otherwise consider the quantum instruction 922 as "$m_{high}$." In various cases, the aggregation component 114 can determine that $m_{low}$ (e.g., 918) and $m_{high}$ (e.g., 922) do not share qubits (e.g., 918 operates on qubit 1, while 922 operates on qubit 2), per act 604. Then, the aggregation component 114 can determine that $m_{high}$ (e.g., 922) is the last quantum instruction in the quantum program 106, per act 606. Thus, the aggregation component 114 can proceed to branch D.

Figure 15:
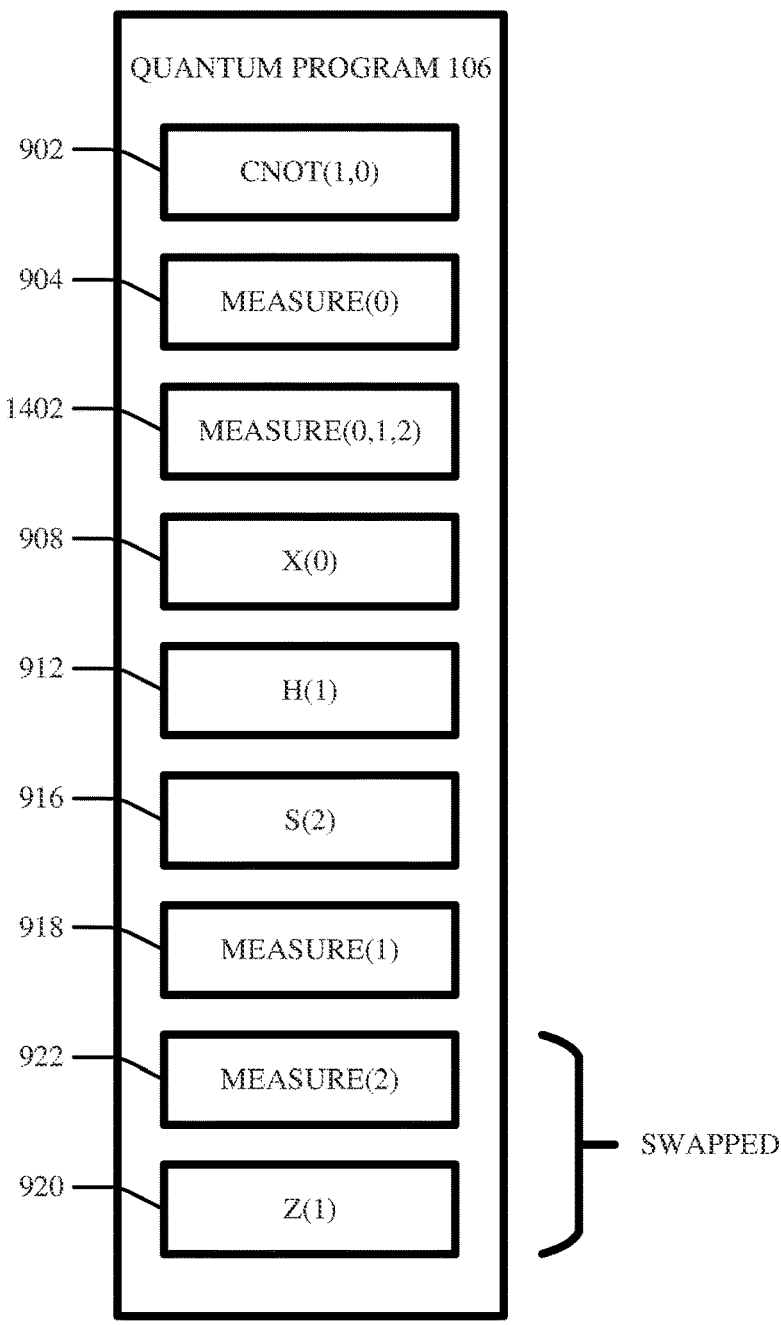

At act 702, the aggregation component 114 can mark, label, and/or otherwise consider the quantum instruction 920 as $q_{prev}$ (e.g., 920 immediately precedes 922). The aggregation component 114 can then determine that $q_{prev}$ (e.g., 920) is not a quantum measurement instruction (e.g., 920 is Z(1)), per act 704. Next, the aggregation component 114 can determine that $m_{high}$ (e.g., 922) and $q_{prev}$ (e.g., 920) do not share qubits (e.g., 922 operates on qubit 2, while 920 operates on qubit 1), per act 706. Thus, the aggregation component 114 can swap $m_{high}$ (e.g., 922) and $q_{prev}$ (e.g., 920), per act 710. This is shown in FIG. 15.

Figure 16:
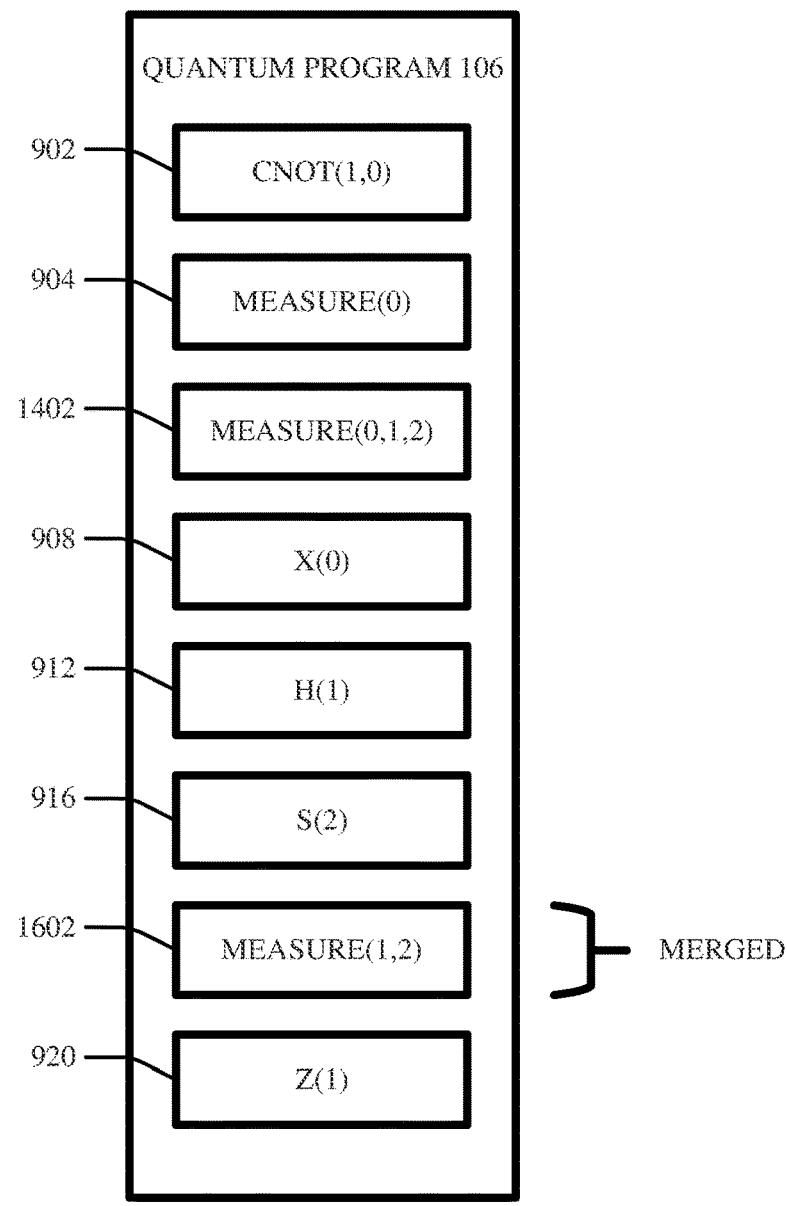

The aggregation component 114 can then return back to act 702. Thus, the aggregation component 114 can mark, label, and/or otherwise consider the quantum instruction 918 as $q_{prev}$ (e.g., 918 now immediately precedes 922). The aggregation component 114 can then determine that $q_{prev}$ (e.g., 918) is a quantum measurement instruction (e.g., 918 is measure(1)), per act 704. So, the aggregation component 114 can merge $m_{high}$ (e.g., 922) and $q_{prev}$ (e.g., 918) into a single resulting quantum instruction, as shown in FIG. 16. That is, the quantum instruction 1602 can be the result of merging the quantum instruction 918 and the quantum instruction 922 (e.g., 918 was measure(1) and 922 was measure(2); thus, 1602 is measure(1,2)). The aggregation component 114 can mark, label, and/or otherwise consider the quantum instruction 1602 as "$m_{low}$," per act 708, and the aggregation component 114 can go to act 506.

The aggregation component 114 can determine, at act 506, that the next quantum measurement instruction does not exist (e.g., there is no other quantum measurement instruction after 1602). Thus, the aggregation component 114 can proceed to act 304. That is, the version of the quantum program 106 that is depicted in FIG. 16 can be considered as the optimized quantum program 208.

Note that the quantum program 106 in this example began with six separate quantum measurement instructions as shown in FIG. 9 (e.g., 904, 906, 910, 914, 918, 922). Moreover, note that the quantum program 106 in this example ended with only three separate quantum measurement instructions as shown in FIG. 16 (e.g., 904, 1402, and 1602). As explained above, this reduction in the number of quantum measurement instructions means that the version of the quantum program 106 that is depicted in FIG. 16 (e.g., the optimized quantum program 208) can be executed on the quantum computing device 104 in less time and/or with consumption of fewer computational resources, as compared to the version of the quantum program 106 that is depicted in FIG. 9. Moreover, because the aggregation constraint 206 was always obeyed, it is guaranteed that the version of the quantum program 106 that is depicted in FIG. 16 is substantively equivalent to that depicted in FIG. 9. In other words, FIGS. 9-16 illustrate a non-limiting example that shows how the aggregation component 114 can utilize the swap operation 202, the merge operation 204, and the aggregation constraint 206 to reduce a number of quantum measurement instructions in the quantum program 106.

Figure 17:
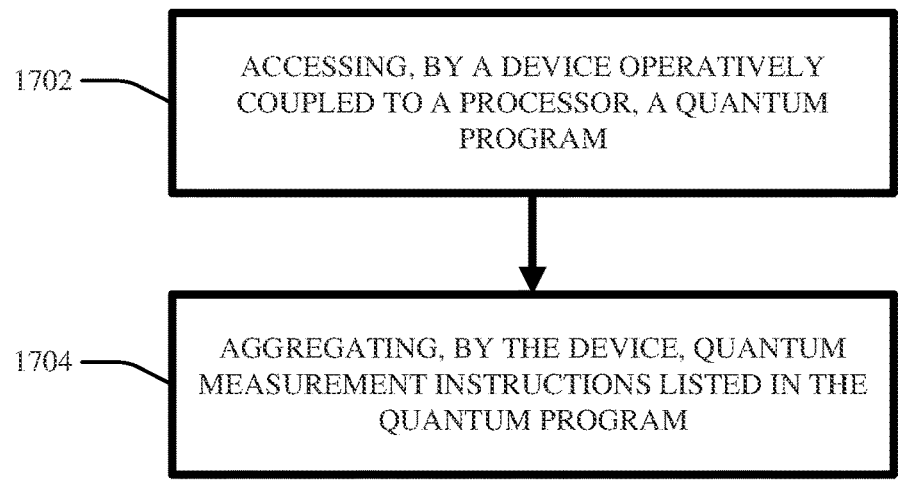
FIGS. 17-18 illustrate flow diagrams of example, non-limiting computer-implemented methods that facilitate measurement aggregation in quantum programs in accordance with one or more embodiments described herein.
Figure 18:
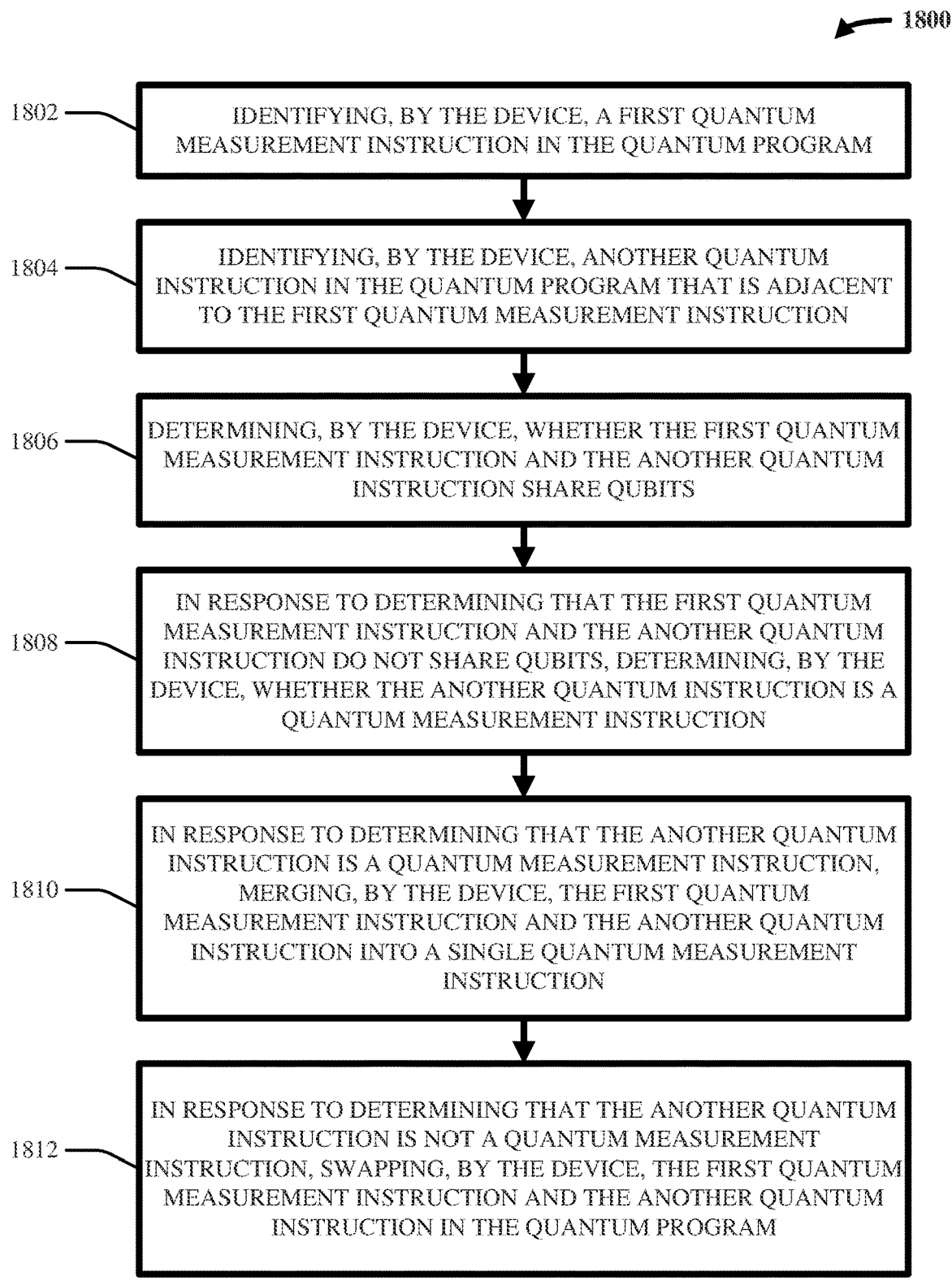

FIGS. 17-18 illustrate flow diagrams of example, non-limiting computer-implemented methods 1700 and 1800 that can facilitate measurement aggregation in quantum programs in accordance with one or more embodiments described herein.

Consider the computer-implemented method 1700. In various embodiments, act 1702 can include accessing, by a device (e.g., 112) operatively coupled to a processor, a quantum program (e.g., 106).

In various instances, act 1704 can include aggregating, by the device (e.g., 114), quantum measurement instructions (e.g., 904, 906, 910, 914, 918, 922) listed in the quantum program.

Although not shown in FIG. 17, the computer-implemented method 1700 can, in some cases, further comprise: executing, by the device (e.g., 116), a measurement-aggregated version (e.g., 208) of the quantum program that results from the aggregating the quantum measurement instructions.

Consider the computer-implemented method 1800. In various cases, the computer-implemented method 1800 depicts various sub-actions that can collectively make up act 1704.

In various embodiments, act 1802 can include identifying, by the device (e.g., 114), a first quantum measurement instruction in the quantum program.

In various aspects, act 1804 can include identifying, by the device (e.g., 114), another quantum instruction in the quantum program that is adjacent to the first quantum measurement instruction. In some cases, the another quantum instruction can follow the first quantum measurement instruction. In other cases, the another quantum instruction can precede the first quantum measurement instruction.

In various instances, act 1806 can include determining, by the device (e.g., 114), whether the first quantum measurement instruction and the another quantum instruction share qubits.

In various cases, act 1808 can include, in response to determining that the first quantum measurement instruction and the another quantum instruction do not share qubits, determining, by the device (e.g., 114), whether the another quantum instruction is a quantum measurement instruction.

In various aspects, act 1810 can include, in response to determining that the another quantum instruction is a quantum measurement instruction, merging, by the device (e.g., 114 can apply 204), the first quantum measurement instruction and the another quantum instruction into a single quantum measurement instruction.

In various instances, act 1812 can include, in response to determining that the another quantum instruction is not a quantum measurement instruction, swapping, by the device (e.g., 114 can apply 202), the first quantum measurement instruction and the another quantum instruction in the quantum program.

Quantum measurement instructions can be resource-intensive due to hardware acquisition time and/or classical data processing. Although this can be particularly true for quantum computing devices that implement multiplexed readout hardware, it can also be generally true for any quantum computing devices. Embodiments of the invention can improve runtime of quantum programs that involve multiple measurements by aggregating the measurements as described herein without changing the substance (e.g., the result and/or meaning) of the quantum programs. As described in depth above, various embodiments of the invention include systems and/or techniques that can electronically apply swap operations and/or merge operations to a quantum program, in accordance with an aggregation constraint. When the swap operations and/or merge operations are implemented so as to not violate the aggregation constraint, the number of quantum measurement instructions in the quantum program can be reduced without affecting the net result of the quantum program (e.g., serially-implemented single-qubit measurement instructions can be parallelized and/or combined to create fewer multi-qubit measurement instructions). When fewer quantum measurement instructions are included in the quantum program, the quantum program can consume less time and/or fewer resources during execution. Thus, various techniques disclosed herein can be considered as computer-implemented methods that re-format a quantum program so that the quantum program can be more efficiently executed. Because computing time can be reduced and/or because computational resources can be saved by embodiments of the invention, embodiments of the invention certainly constitute a concrete and tangible technical improvement in the field of quantum computing.

Various embodiments of the invention can be considered as a computerized tool that can electronically receive as input a quantum program, that can electronically re-format the quantum program as described herein (e.g., via swap and/or merge operations subject to an aggregation constraint), and that can electronically execute the re-formatted version of the quantum program on a quantum computing device.

Various embodiments of the invention can be considered as maintaining classical control flow of a quantum program at intermediate stages of the program. That is, various embodiments of the invention do not require replacing classical operations with quantum conditional operations. Moreover, various embodiments of the invention, as described above, can push quantum measurement instructions to earlier time slots and/or to later time slots, as needed.

Figure 19:
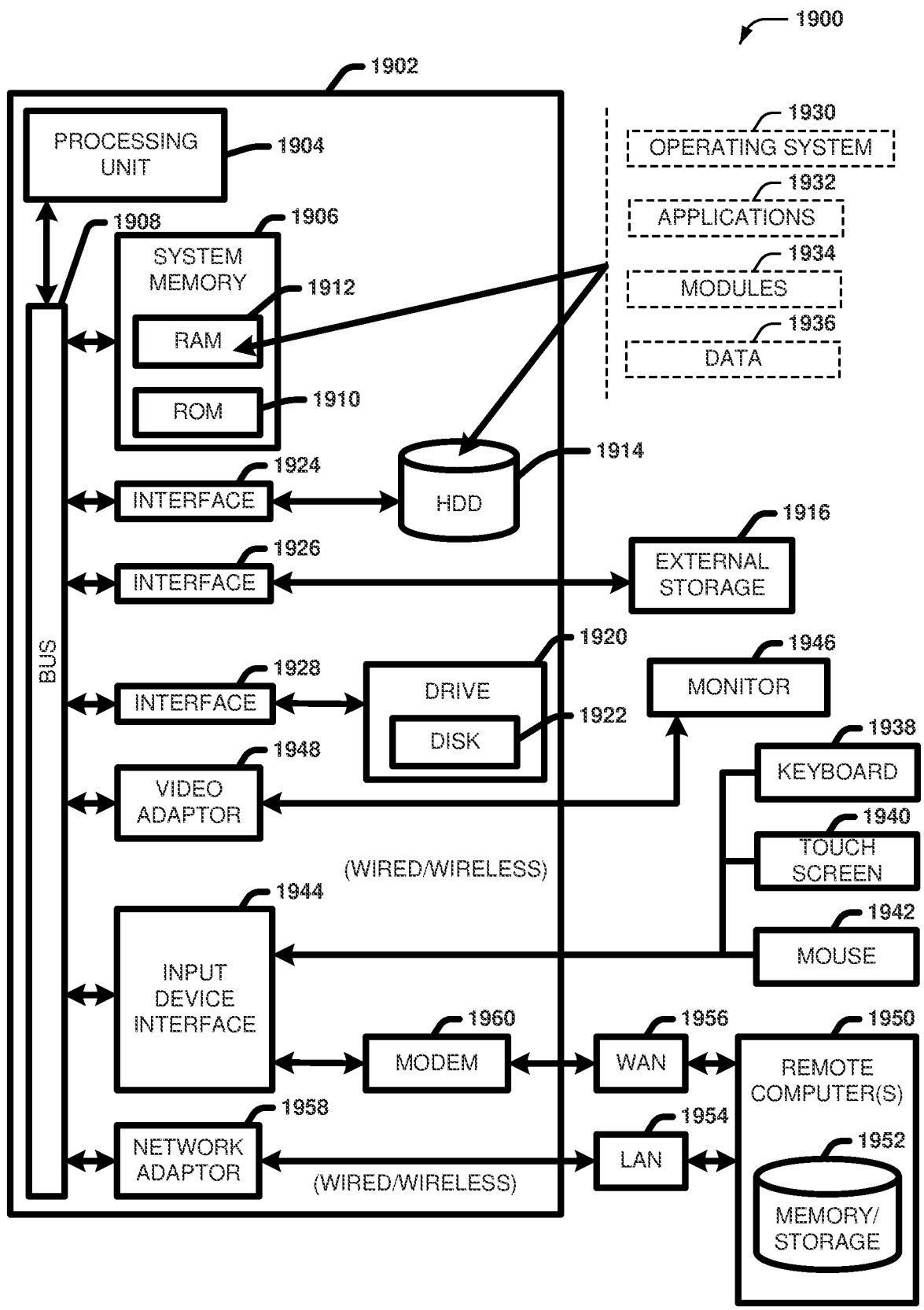
FIG. 19 illustrates a block diagram of an example, non-limiting operating environment in which one or more embodiments described herein can be facilitated.

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and a drive 1920, e.g., such as a solid state drive, an optical disk drive, which can read or write from a disk 1922, such as a CD-ROM disc, a DVD, a BD, etc. Alternatively, where a solid state drive is involved, disk 1922 would not be included, unless separate. While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and drive 1920 can be connected to the system bus 1908 by an HDD interface 1924, an external storage interface 1926 and a drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the Internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above, such as but not limited to a network virtual machine providing one or more aspects of storage or processing of information. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 20:
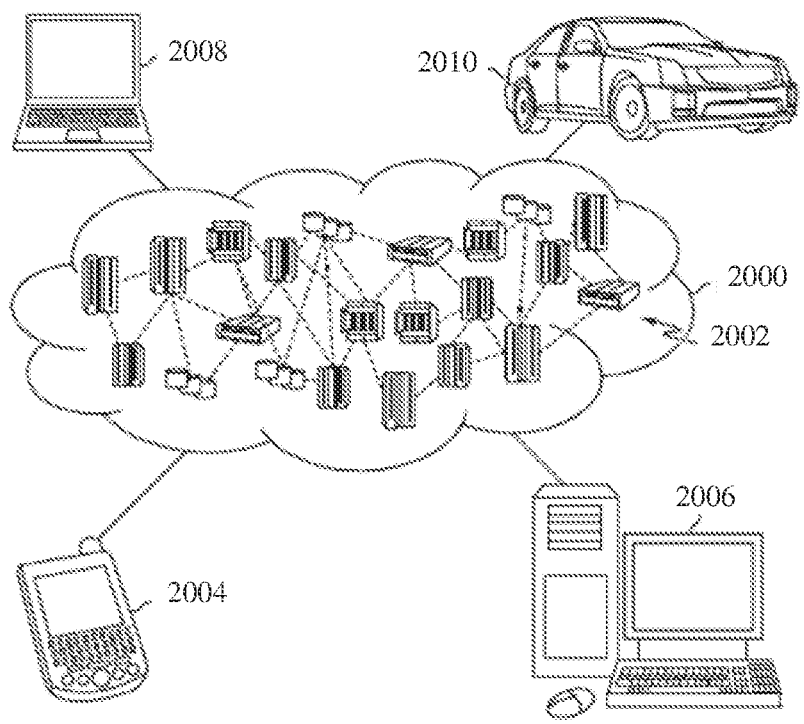
FIG. 20 illustrates an example, non-limiting cloud computing environment in accordance with one or more embodiments described herein.

Referring now to FIG. 20, illustrative cloud computing environment 2000 is depicted. As shown, cloud computing environment 2000 includes one or more cloud computing nodes 2002 with which local computing devices used by cloud consumers, such as, for example, personal digital assistant (PDA) or cellular telephone 2004, desktop computer 2006, laptop computer 2008, and/or automobile computer system 2010 may communicate. Nodes 2002 may communicate with one another. They may be grouped (not shown) physically or virtually, in one or more networks, such as Private, Community, Public, or Hybrid clouds as described hereinabove, or a combination thereof. This allows cloud computing environment 2000 to offer infrastructure, platforms and/or software as services for which a cloud consumer does not need to maintain resources on a local computing device. It is understood that the types of computing devices 2004-2010 shown in FIG. 20 are intended to be illustrative only and that computing nodes 2002 and cloud computing environment 2000 can communicate with any type of computerized device over any type of network and/or network addressable connection (e.g., using a web browser).

Figure 21:
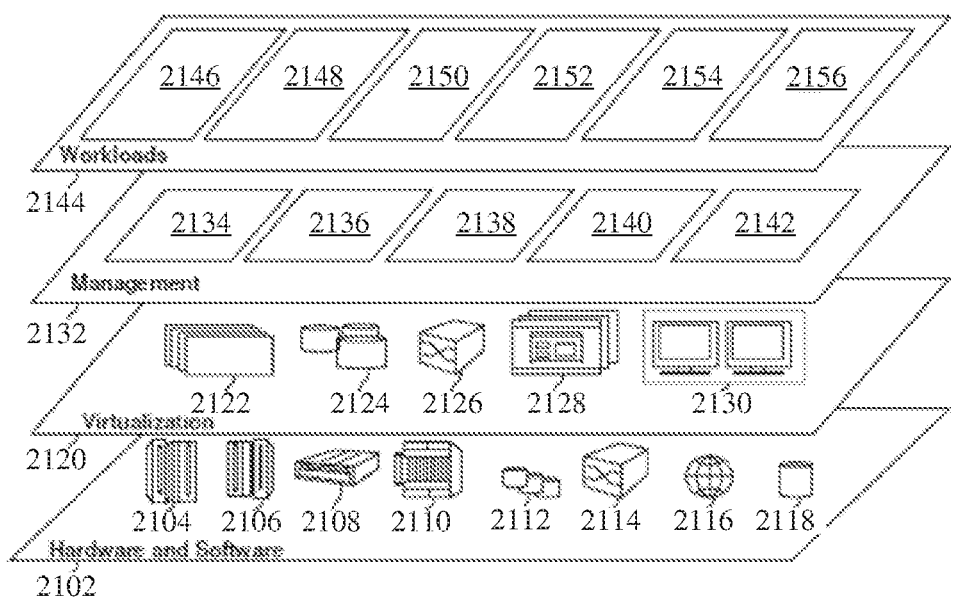
FIG. 21 illustrates example, non-limiting abstraction model layers in accordance with one or more embodiments described herein.

Referring now to FIG. 21, a set of functional abstraction layers provided by cloud computing environment 2000 (FIG. 20) is shown. Repetitive description of like elements employed in other embodiments described herein is omitted for sake of brevity. It should be understood in advance that the components, layers, and functions shown in FIG. 21 are intended to be illustrative only and embodiments of the invention are not limited thereto. As depicted, the following layers and corresponding functions are provided.

Hardware and software layer 2102 includes hardware and software components. Examples of hardware components include: mainframes 2104; RISC (Reduced Instruction Set Computer) architecture based servers 2106; servers 2108; blade servers 2110; storage devices 2112; and networks and networking components 2114. In some embodiments, software components include network application server software 2116 and database software 2118.

Virtualization layer 2120 provides an abstraction layer from which the following examples of virtual entities may be provided: virtual servers 2122; virtual storage 2124; virtual networks 2126, including virtual private networks; virtual applications and operating systems 2128; and virtual clients 2130.

In one example, management layer 2132 may provide the functions described below. Resource provisioning 2134 provides dynamic procurement of computing resources and other resources that are utilized to perform tasks within the cloud computing environment. Metering and Pricing 2136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2138 provides access to the cloud computing environment for consumers and system administrators. Service level management 2140 provides cloud computing resource allocation and management such that required service levels are met. Service Level Agreement (SLA) planning and fulfillment 2142 provide pre-arrangement for, and procurement of, cloud computing resources for which a future requirement is anticipated in accordance with an SLA.

Workloads layer 2144 provides examples of functionality for which the cloud computing environment may be utilized. Examples of workloads and functions which may be provided from this layer include: mapping and navigation 2146; software development and lifecycle management 2148; virtual classroom education delivery 2150; data analytics processing 2152; transaction processing 2154; and differentially private federated learning processing 2156. Various embodiments of the present invention can utilize the cloud computing environment described with reference to FIGS. 20 and 21 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on standalone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes at least one of the computer-executable components that:
        accesses a quantum program comprising quantum instructions, wherein the quantum instructions comprise quantum measurement instructions and quantum non-measurement instructions, wherein the quantum measurement instructions perform operations that measure current states of qubits, and wherein the quantum non-measurement instructions perform operations associated with the qubits other than the operations that measure the current states of the qubits; and
        generates a measurement aggregated quantum program that reduces a total quantity of the quantum measurement instructions in the quantum program by swapping at least one pair of adjacent quantum instructions of the quantum program, and merging at least one group of adjacent quantum measurement instructions of the quantum program into a multi-qubit quantum measurement instruction.

2. The system of claim 1, wherein the generating the measurement aggregated quantum program further comprises:
    identifying a first quantum instruction in the quantum program that is a first quantum measurement instruction;
    identifying a second quantum instruction in the quantum program that is adjacent to the first quantum measurement instruction; and
    determining whether the first quantum measurement instruction and the second quantum instruction are performing operations on a same qubit.

3. The system of claim 2, wherein the generating the measurement aggregated quantum program further comprises:
    in response to determining that the first quantum measurement instruction and the second quantum instruction are not performing operations on the same qubit, determining whether the second quantum instruction is a second quantum measurement instruction.

4. The system of claim 3, wherein the generating the measurement aggregated quantum program further comprises:
    in response to determining that the second quantum instruction is the second quantum measurement instruction, merging the first quantum measurement instruction and the second quantum measurement instruction into the multi-qubit quantum measurement instruction.

5. The system of claim 3, wherein the generating the measurement aggregated quantum program further comprises:
    in response to determining that the second quantum instruction is not the second quantum measurement instruction, swapping the first quantum measurement instruction and the second quantum instruction in the quantum program.

6. The system of claim 2, wherein the second quantum instruction follows the first quantum measurement instruction in the quantum program.

7. The system of claim 2, wherein the second quantum instruction precedes the first quantum measurement instruction in the quantum program.

8. A computer-implemented method, comprising:
    accessing, by a device operatively coupled to a processor, a quantum program comprising quantum instructions, wherein the quantum instructions comprise quantum measurement instructions and quantum non-measurement instructions, wherein the quantum measurement instructions perform operations that measure current states of qubits, and wherein the quantum non-measurement instructions perform operations associated with the qubits other than the operations that measure the current states of the qubits; and
    generating, by the device, a measurement aggregated quantum program that reduces a total quantity of the quantum measurement instructions in the quantum program by swapping at least one pair of adjacent quantum instructions of the quantum program, and merging at least one group of adjacent quantum measurement instructions of the quantum program into a multi-qubit quantum measurement instruction.

9. The computer-implemented method of claim 8, wherein the generating the measurement aggregated quantum program further comprises:
    identifying, by the device, a first quantum instruction in the quantum program that is a first quantum measurement instruction;
    identifying, by the device, a second quantum instruction in the quantum program that is adjacent to the first quantum measurement instruction; and
    determining, by the device, whether the first quantum measurement instruction and the a second quantum instruction are performing operations on a same qubit.

10. The computer-implemented method of claim 9, wherein the generating the measurement aggregated quantum program further comprises:
    in response to determining that the first quantum measurement instruction and the second quantum instruction are not performing operations on the same qubit, determining whether the second quantum instruction is a second quantum measurement instruction.

11. The computer-implemented method of claim 10, wherein the generating the measurement aggregated quantum program further comprises:
    in response to determining that the second quantum instruction is the second quantum measurement instruction, merging the first quantum measurement instruction and the second quantum measurement instruction into the multi-qubit quantum measurement instruction.

12. The computer-implemented method of claim 10, wherein the aggregating further comprises:
in response to determining that the second quantum instruction is not the second quantum measurement instruction, swapping the first quantum measurement instruction and the second quantum instruction in the quantum program.

13. The computer-implemented method of claim 9, wherein the second quantum instruction follows the first quantum measurement instruction in the quantum program.

14. The computer-implemented method of claim 9, wherein the second quantum instruction precedes the first quantum measurement instruction in the quantum program.

15. A computer program product for facilitating measurement aggregation in quantum programs, the computer program product comprising a computer-readable memory having program instructions embodied therewith, the program instructions executable by a processor to cause the processor to:
access a quantum program comprising quantum instructions, wherein the quantum instructions comprise quantum measurement instructions and quantum non-measurement instructions, wherein the quantum measurement instructions perform operations that measure current states of qubits, and wherein the quantum non-measurement instructions perform operations associated with the qubits other than the operations that measure the current states of the qubits; and
generate a measurement aggregated quantum program that reduces a total quantity of the quantum measurement instructions in the quantum program by swapping at least one pair of adjacent quantum instructions of the quantum program, and merging at least one group of adjacent quantum measurement instructions of the quantum program into a multi-qubit quantum measurement instruction.

16. The computer program product of claim 15, wherein the generating the measurement aggregated quantum program further comprises:
identifying a first quantum instruction in the quantum program that is a first quantum measurement instruction;
identifying a second quantum instruction in the quantum program that is adjacent to the first quantum measurement instruction; and
determining whether the first quantum measurement instruction and the a second quantum instruction are performing operations on a same qubit.

17. The computer program product of claim 16, wherein the generating the measurement aggregated quantum program further comprises:
in response to determining that the first quantum measurement instruction and the second quantum instruction are not performing operations on the same qubit, determining whether the another quantum instruction is a second quantum measurement instruction.

18. The computer program product of claim 17, wherein the generating the measurement aggregated quantum program further comprises:
in response to determining that the second quantum instruction is the second quantum measurement instruction, merging the first quantum measurement instruction and the second quantum measurement instruction into the multi-qubit quantum measurement instruction.

19. The computer program product of claim 17, wherein the generating the measurement aggregated quantum program further comprises:
in response to determining that the second quantum instruction is not the second quantum measurement instruction, swapping the first quantum measurement instruction and the second quantum instruction in the quantum program.

20. The computer program product of claim 16, wherein the second quantum instruction follows the first quantum measurement instruction or precedes the first quantum measurement instruction in the quantum program.

* * * * *